(12) United States Patent
Butera et al.

(10) Patent No.: US 11,269,805 B2
(45) Date of Patent: Mar. 8, 2022

(54) SIGNAL PATHWAYS IN MULTI-TILE PROCESSORS

(71) Applicant: Intel Corporation, Santa Clara, CA (US)

(72) Inventors: William J. Butera, Newton, MA (US); Simon C. Steely, Jr., Hudson, NH (US); Richard J. Dischler, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 332 days.

(21) Appl. No.: 15/980,579

(22) Filed: May 15, 2018

(65) Prior Publication Data
US 2019/0042534 A1    Feb. 7, 2019

(51) Int. Cl.
*G06F 15/80*   (2006.01)
*G06F 9/54*    (2006.01)
(Continued)

(52) U.S. Cl.
CPC ............ *G06F 15/80* (2013.01); *G06F 9/4482* (2018.02); *G06F 9/546* (2013.01); *G06F 11/0709* (2013.01); *G06F 11/0718* (2013.01); *G06F 15/167* (2013.01); *G06F 15/17306* (2013.01); *H04L 41/0618* (2013.01)

(58) Field of Classification Search
CPC ......... G05F 15/17337; G05F 15/17343; G05F 11/1423; G05F 11/1425; G05F 11/1428; G05F 11/143
See application file for complete search history.

(56) References Cited

U.S. PATENT DOCUMENTS 8,151,088 B1 *   4/2012  Bao .................. G06F 15/17312
                                                    712/11
2007/0220522 A1 *  9/2007 Coene ................ G06F 30/394
                                                    718/104
(Continued)

OTHER PUBLICATIONS

Mange—Towards Robust Integrated Circuits the Embroyonics Approach—IEEE vol. 88, No. Apr. 4, 2000 (Year: 2000).*

(Continued)

*Primary Examiner* — Bryce P Bonzo
*Assistant Examiner* — Michael Xu
(74) *Attorney, Agent, or Firm* — Schwabe, Williamson & Wyatt, P.C.

(57) ABSTRACT

Embodiments herein may present a multi-tile processor including a plurality of processor tiles, and a plurality of interconnects selectively coupling the plurality of processor tiles to each other. A first processor tile may include a memory to store a bulletin board to hold a message, an execution unit, and an encapsulated software module. The encapsulated software module may select a second processor tile coupled with the first processor tile by an interconnect to be a part of a signal pathway. The second processor tile may be selected based on a selection criterion of the signal pathway and the message held in the bulletin board. The encapsulated software module may post and read a message at the bulletin board stored in the memory, or read a message from a bulletin board stored in a memory of the second processor tile. Other embodiments may be described and/or claimed.

14 Claims, 17 Drawing Sheets

(51) Int. Cl.
*G06F 15/167* (2006.01)
*G06F 9/448* (2018.01)
*G06F 15/173* (2006.01)
*G06F 11/07* (2006.01)
*H04L 41/0604* (2022.01)

(56) References Cited

U.S. PATENT DOCUMENTS

| | | | | |
|---|---|---|---|---|
| 2011/0307734 | A1* | 12/2011 | Boesen | G06F 8/31 |
| | | | | 714/3 |
| 2013/0031334 | A1* | 1/2013 | El-Essawy | G06F 15/17312 |
| | | | | 712/30 |
| 2014/0149992 | A1* | 5/2014 | Zimmer | G06F 9/5077 |
| | | | | 718/104 |
| 2015/0312378 | A1* | 10/2015 | Yang | G06F 9/467 |
| | | | | 709/203 |
| 2016/0006655 | A1* | 1/2016 | Hyoudou | H04L 45/74 |
| | | | | 370/392 |
| 2018/0113838 | A1 | 4/2018 | Butera et al. | |
| 2019/0057060 | A1* | 2/2019 | Nicol | G06N 3/08 |

OTHER PUBLICATIONS

N.B. Bowden; "Order and Disorder: Mesoscale Self Assembly and Waves," PhD in Dept. of Chemistry, Harvard, Sep. 20, 1999, 333 pages.

* cited by examiner

SIGNAL PATHWAYS IN MULTI-TILE PROCESSORS

FIELD

Embodiments of the present disclosure relate generally to the technical field of computing, and more particularly to computing with multiple processor tiles.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A multi-tile processor may include multiple processor tiles. A processor tile may include a computing unit, a processor core, a core, a processing engine, an execution unit, or a central processing unit (CPU), caches, and switches. Each processor tile may be coupled to one or more neighboring processor tiles by interconnects according to a topology. A signal pathway from a first processor tile to a second processor tile may include one or more interconnects to couple the first processor tile to the second processor tile through some intermediate processor tiles.

A large number of processor tiles may be formed on a die. The large number of processor tiles on a die may increase the communication complexity as well as the defect rate of the processor tiles and interconnects. In current practice, in order for a multi-tile processor on a die to function properly, the multi-tile processor may have to have a near faultless hardware realization of the processor tiles and interconnects. Hence, a multi-tile processor with large numbers of tiles may not survive a practical manufacturing defect rate.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
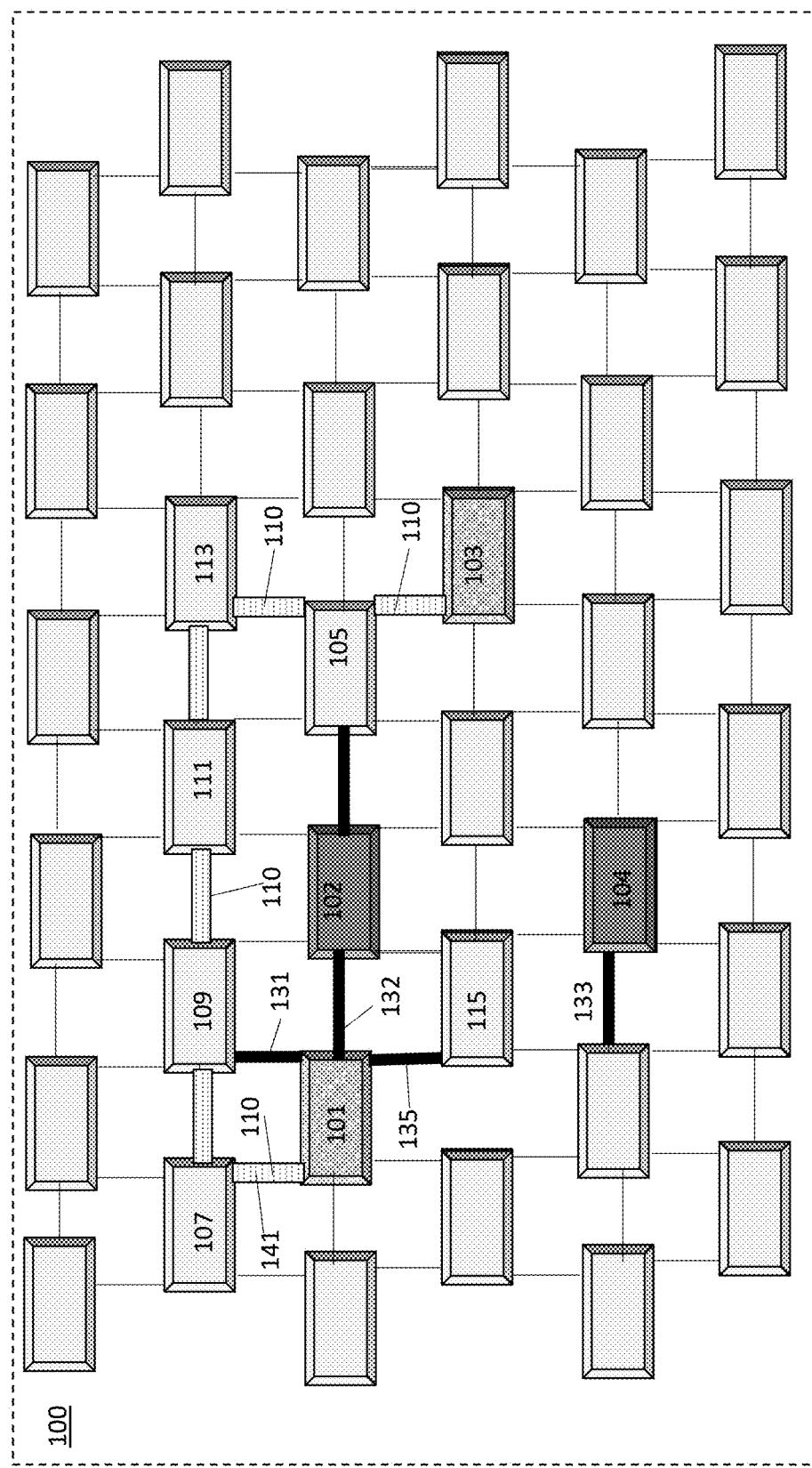
FIG. 1 illustrates an example computational device including multiple processor tiles on a die, and a signal pathway between two processor tiles, in accordance with various embodiments.

Apparatuses, methods, and storage medium are disclosed herein related to the formations of signal pathways including multiple processor tiles coupled by interconnects on a multi-tile processor with a defect rate. Current solutions for the formation of a signal pathway may employ techniques running on a single centralized controller. As such, current solutions for the formations of signal pathways between processor tiles of a multi-tile processor may not work when the multi-tile processor have a significant failure rate, e.g., larger than 4%, of the processor tiles or interconnects. Hereinafter, a processor tile may simply be referred to as a tile.

Embodiments herein may present techniques for automatic formation of a signal pathway between two processor tiles on a multi-tile processor with multiple processor tiles and interconnects, where a significant subset may be faulty. In embodiments, the formation of a signal pathway, which may be referred to as routing, may be based on decentralized local interactions between adjacent tiles, to produce a dedicated signal pathway that may be optimal against selectable criteria, such as latency, energy, heat, or routing density of adjacent tiles. Without a centralized controller for the formation of a signal pathway, unsupervised local message passing between random collections of tiles on the multi-tile processor may be utilized to form the signal pathway. The formation of a signal pathway between any two processor tiles may be modeled on the dynamics of material self-assembly, following governing equations for a physical system having multiple elements. Such a decentralized or distributed solution for the formation of signal pathways may overcome fundamental limits on scaling, complexity, adaptation and setup time, for a multi-tile processor with multiple processor tiles and interconnects, where a significant subset may be faulty. Embodiments herein may be applicable to a multi-tile processor for tile counts larger than 500, e.g., in the range of about 500 to $O(10^4)$, with defect rates in the range of 5-20%. Additionally, embodiments herein may have performances that scales with the number of tiles, e.g., scaling over 10,000 tiles, such as 70,000 tiles.

Embodiments herein may present a multi-tile processor including a plurality of processor tiles, and a plurality of interconnects selectively coupling the plurality of processor tiles to each other. At least a first processor tile of the plurality of processor tiles may include a memory to store a bulletin board to hold a message, an execution unit coupled to the memory, and an encapsulated software module to be executed by the execution unit. The encapsulated software module, in response to execution, may select a second processor tile of the plurality of processor tiles coupled with the first processor tile by an interconnect to be a part of a signal pathway. The second processor tile may be selected based at least in part on a selection criterion of the signal pathway and the message held in the bulletin board. The encapsulated software module may post and read a message at the bulletin board stored in the memory, or read a message from a bulletin board stored in a memory of the second processor tile.

Embodiments herein may present a multi-tile processor including a plurality of processor tiles, and a plurality of interconnects selectively coupling the plurality of processor tiles to each other. One or more of the plurality of processor tiles, or one or more of the plurality of interconnects may be faulty. A signal pathway may exist between a first processor tile and a second processor tile of the plurality of processor tiles. The signal pathway may include a set of non-faulty processor tiles and a set of non-faulty interconnects selected from the plurality of processor tiles and the plurality of interconnects. Each intermediate processor tile of the signal pathway, between the first and the second processor file, may select an adjacent non-faulty processor tile and a non-faulty interconnect coupling the selecting processor tile to the adjacent non-faulty processor tile to constitute the signal pathway.

Embodiments herein may present a method for configuring a signal pathway on an integrated circuit (IC) die. The method may include: selecting, by a first processor file, an adjacent processor tile of the first processor tile to be a part of the signal pathway to a second processor tile, the adjacent, first and second processor tiles being members of the IC die. The method may further include: receiving subsequently, from the adjacent processor tile, by the first processor tile, a confirmation that all intermediate processor tiles of the signal pathway to the second processor tile have been selected. In addition, the method may include: configuring, by the first processor tile, in response to the receipt of the confirmation, internal circuitry of the first processor tile, to enable the first processor tile to participate in signal routing on the signal pathway.

In the description to follow, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

FIG. 1 illustrates an example computational device 100 including multiple processor tiles, e.g., a processor tile 101, a processor tile 103, a processor tile 105, a processor tile 107, a processor tile 102, a processor tile 104, and so forth, on a die, and a signal pathway 110 between two processor tiles 101 and 103, in accordance with various embodiments. For clarity, features of the computational device 100 may be described below as an example for understanding an example computational device that may include multiple processor tiles. It is to be understood that there may be more or fewer components included in the computational device 100 with multiple processor tiles. Further, it is to be understood that one or more of the devices and components within the computational device 100 may include additional and/or varying features from the description below, and may include any device that one having ordinary skill in the art would consider and/or refer to as a computational device including multiple processor tiles.

In embodiments, the computational device 100 may include the processor tile 101, the processor tile 103, the processor tile 105, the processor tile 107, a processor tile 109, a processor tile 111, a processor tile 113, a processor tile 115, the processor tile 102, the processor tile 104, in addition to many other processor tiles, on a die. In embodiments, there may be thousands of processor tiles included in the computational device 100, e.g., from about 500 processor tiles to about 70,000 processor tiles. The processor tiles of the computational device 100 may have the same structure. In some other embodiments, the processor tiles of the computational device 100 may have different structures from one another.

In embodiments, a processor tile may be coupled to multiple other processor tiles by interconnects. For example, the processor tile 101 may be coupled to the processor tile 107 by an interconnect 141, the processor tile 109 by an interconnect 131, the processor tile 102 by an interconnect 132, the processor tile 115 by an interconnect 135, and more. Two processor tiles coupled by an interconnect may be referred to as adjacent processor tiles. For example, the processor tile 101 may be adjacent to the processor tile 107, the processor tile 109, the processor tile 102, and the processor tile 115. In some other embodiments, there may by different number of processor tiles coupled to a processor tile.

In embodiments, one or more of the plurality of processor tiles, or one or more of the plurality of interconnects of the computational device 100 may be faulty. For example, the processor tile 102, the interconnect 131, the interconnect 132, and the interconnect 135 may be faulty. In addition, the processor tile 104 and an interconnect 133 may be faulty. In some embodiments, the one or more faulty processor tiles or the one or more faulty interconnects may amount to about 4%-20% of the plurality of processor tiles or 4%-20% of the plurality of interconnects.

In embodiments, the signal pathway 110 may be formed between the processor tile 101 and the processor tile 103, where the signal pathway 110 may include a set of non-faulty processor tiles, e.g., the processor tile 107, the processor tile 109, the processor tile 111, the processor tile 113, the processor tile 105, and the processor tile 103, coupled by a set of non-faulty interconnects. Among them, the processor tile 107, the processor tile 109, the processor tile 111, the processor tile 113, or the processor tile 105, may be an intermediate processor tile. The processor tile 101 may select the processor tile 107 among a set of adjacent processor tiles to be a part of the signal pathway 110, based at least in part on a selection criterion of the signal pathway 110. In addition, each intermediate processor tile of the signal pathway 110 between the processor tile 101 and the processor tile 103 may select an adjacent non-faulty processor tile and a non-faulty interconnect coupling the selecting processor tile to the adjacent non-faulty processor tile to constitute the signal pathway 110. For example, the processor tile 107 may select the processor tile 109 from a set of adjacent processor tiles to be a part of the signal pathway 110. Furthermore, the processor tile 109 may select the processor tile 111 from a set of adjacent processor tiles to be a part of the signal pathway 110.

In embodiments, the signal pathway 110 between the processor tile 101 and the processor tile 103 may be a shortest path between the processor tile 101 and the processor tile 103 based on the selection criterion applied to the plurality of processor tiles. The selection criterion may include a relationship between a processor tile and other processor tiles of the computational device 100, defined by a congestion, a distance, a load balance, a heat energy, or a boundary limit.

Figure 2:
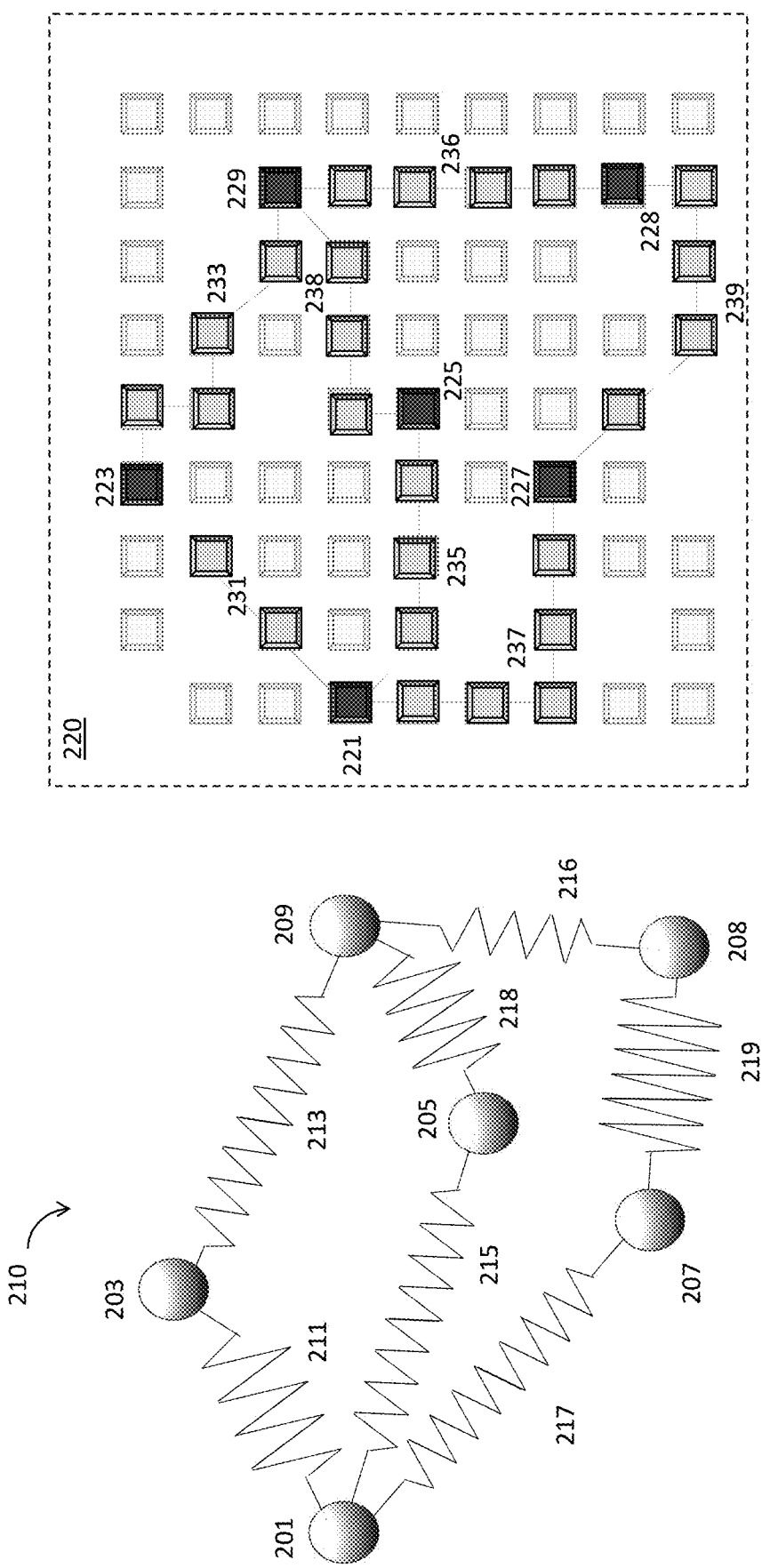
FIG. 2 illustrates an example computational device including multiple signal pathways formed according to governing equations for a physical system, in accordance with various embodiments.

FIG. 2 illustrates an example computational device 220 including multiple signal pathways formed according to governing equations for a physical system 210, in accordance with various embodiments. The computational device 220 may be an example of the computational device 100 shown in FIG. 1.

In embodiments, the physical system 210 may include multiple mass elements, e.g., a mass element 201, a mass element 203, a mass element 205, a mass element 207, a mass element 208, and a mass element 209, coupled by springs, e.g., a spring 211, a spring 213, a spring 215, a spring 217, a spring 219, a spring 216, and a spring 218, according to a topology as shown. The springs, e.g., the spring 211, the spring 213, the spring 215, the spring 217, the spring 219, the spring 216, and the spring 218, may have a uniform spring constant. In addition, the mass elements, e.g., the mass element 201, the mass element 203, the mass element 205, the mass element 207, the mass element 208, and the mass element 209 may have a uniform mass value. According to the law of physics, e.g., Hooke's law of force related to spring constant and distances, the physical system 210 may converge to a uniform spatial distribution of the mass elements. Starting from a random initial position, the mass elements may undergo damped harmonic oscillation, going through parameters and the range of values over which the transient response may converge, and ultimately converging to a stable rest state, as shown in FIG. 2. The parameter of frictional damping may be defined to control the rate of convergence. The final configuration may conform to the global minimum energy state for the physical system 210.

In embodiments, the computational device 220 may include processor tiles, e.g., a processor tile 221, a processor tile 223, a processor tile 225, a processor tile 227, a processor tile 228, and a processor tile 229, coupled by signal pathways, e.g., a signal pathway 231, a signal pathway 233, a signal pathway 235, a signal pathway 237, a signal pathway 239, a signal pathway 236, and a signal pathway 238, according to a topology as shown. The topology for the multiple signal pathways, e.g., the signal pathway 231, the signal pathway 233, the signal pathway 235, the signal pathway 237, the signal pathway 239, the signal pathway 236, and the signal pathway 238 may be formed according to an equivalence between a complex physical system, e.g., the physical system 210, and a target virtual structure of multiple signal pathways, and may be similar to the topology for the springs, e.g., the spring 211, the spring 213, the spring 215, the spring 217, the spring 219, the spring 216, and the spring 218.

In embodiments, the topology of the multiple signal pathways in the computational device 220 may be formed based on the equivalence of the physical system 201 to import the analytic tools and governing equations from the physical system 210, e.g., Hooke's law of force, and further use the governing equations to exert robust engineering control over the formation of the large scale virtual structures of multiple signal pathways. In other words, a mature set of analytic tools for a physical system, e.g., the physical system 210, may be applied to engineer robust on-die network structures of multiple signal pathways for the computational device 220.

In embodiments, the topology of the multiple signal pathways in the computational device 220 may be formed by self-assembly based on local unsupervised interactions of processor tiles. Physical chemists may define material self-assembly as "the spontaneous organization of objects, under equilibrium conditions, into stable aggregates." Local unsupervised interactions between independent agents of a self-assembly system may give rise to complex global structures with extreme scale invariance and tolerance to component failure. Mapping of a self-assembly physical system, e.g., the physical system 210, based on local unsupervised interactions to a computational device, e.g., the computational device 220, may preserve the properties of scale invariance and defect tolerance, to generate robust, complex topologies for the computational device. When a physical system, e.g., the physical system 210, is mapped to a computational device, e.g., the computational device 220, the multiple elements of the physical system may correspond to multiple processor tiles of the computational device. Details of operations by a processor tile may be shown in FIG. 3 below.

Figure 3:
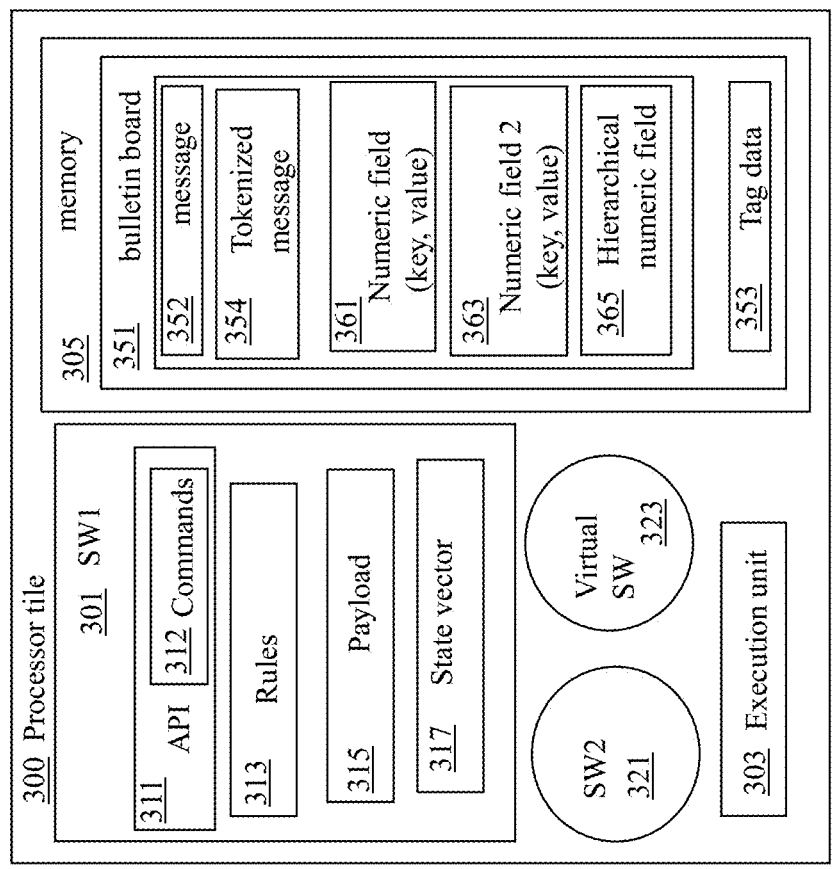
FIG. 3 illustrates an example processor tile including an encapsulated software module, a bulletin board, and numeric fields, to perform functions of self-assembly according to governing equations for a physical system, in accordance with various embodiments.

FIG. 3 illustrates an example processor tile 300 including an encapsulated software module, e.g., an encapsulated software module 301, a bulletin board 351, and numeric fields, e.g., a numeric field 361, a numeric field 363, or a numeric field 365, to perform functions of self-assembly according to governing equations for a physical system, in accordance with various embodiments. The processor tile 300 may be an example of the processor tile 101, or any other processor tile of the computational device 100 shown in FIG. 1, the processor tile 221, or any other processor tile of the computational device 220 shown in FIG. 2. The processor tile 300 or the encapsulated software module 301 included in the processor tile 300 may be mapped to the mass element 201, or any other mass elements of the physical system 210 as shown in FIG. 2.

In embodiments, the processor tile 300 may include a memory 305, an execution unit 303 coupled to the memory 305, and the encapsulated software module 301 to be executed by the execution unit 303. The encapsulated software module 301 may include an application programming interface (API) 311, where the API 311 may include commands 312 to communicate with the execution unit 303 or to communicate with other processor tiles. The encapsulated software module 301 may further include a set of rules 313, a payload 315, and a state vector 317. Multiple encapsulated software modules, e.g., an encapsulated software module 321, or a virtual encapsulated software module 323, may be executed by the execution unit 303. The virtual encapsulated software module 323 may interleave execution of the multiple encapsulated software modules, e.g., the encapsulated software module 301 and the encapsulated software module 321, by time-shared processing on the execution unit 303. The memory 305 may store the bulletin board 351 to hold a message 352, a tokenized message 354, the numeric field 361, the numeric field 363, and the numeric field 365. The encapsulated software module 301 may post and read a message, e.g., the message 352, at the bulletin board 351 stored in the memory 305. The memory 305 may further include tag data 353, which may identify the processor tile 300.

In embodiments, a rule of the set of rules 313 may specify a response to one or more messages held in the bulletin board 351, or a message to a bulletin board of an adjacent processor tile. For example, the response may include information for a replication operation, information for a self-deletion operation, information for an operation to post a local message, information for an idling operation, information for an operation to update a hop count of the signal pathway, information for a propagation operation, information for a numerical calculation, or information for an operation to estimate a distance.

In embodiments, the payload 315 may include data or code to be delivered to an adjacent processor tile. The data or the code included in the payload 315 may be generated by the encapsulated software module 301 based on an atomic function, and wherein the atomic function includes a parameter, an equation, or a single operation. The encapsulated software module 301 may post the message 352 with the payload 315.

In embodiments, the state vector 317 may represent the status of the encapsulated software module 301. The encapsulated software module 301 may encode the state vector 317 into the tokenized message 354 to represent the encapsulated software module 301, and may further post the tokenized message 354 in the bulletin board 351. An adjacent processor tile may read the tokenized message 354, and may instantiate the encapsulated software module 301 by processing the tokenized message. In this way, the encapsulated software module 301 may be cloned into the adjacent processor tile by message passing the tokenized message 354.

In embodiments, the numeric field 361 may include a set of key-value pair posted in the bulletin board 351. The numeric field 361 may be generated or managed by the encapsulated software module 301. The value of the numeric field 361 may be equivalent to a value of a continuous two-dimensional function discretely sampled at the spatial coordinates of the processor tile 300. In addition, the encapsulated software module 301 may compute the numeric field 363 based on the numeric field 361, and other numeric fields of adjacent processor tiles. Furthermore, the numeric field 365 may be a hierarchical numeric field that includes a first level numeric field, e.g., the numeric field 361, and a second level numeric field, e.g., the numeric field 363, and the second level numeric field is computed by the encapsulated software module 301 based on the first level numeric field. The numeric fields may be resilient to processor tile failures and readily scalable to a computational device with a large number of processor tiles, e.g., larger than 10,000 processor tiles.

In embodiments, the processor tile 300 may be mapped to an element of a physical system, e.g., the physical system 210, to perform self-assembly functions to form a signal pathway according to governing equations for the physical system. The dynamics of the self-assembly functions may be captured by the encapsulated software module 301, the bulletin board 351, and numeric fields. These dynamics of self-assembly may be used to guide the encapsulated software module 301 to form the signal pathway. According to the mapping, the encapsulated software module 301 may begin from a random initial position, limit the communication to message passing between adjacent processor tiles, and still anneal to a final configuration that is globally optimal. For example, the processor tile 300 may be a processor tile of a computational device mapped to matched pairs of chemical ions combining, with the following correspondences.

| Processor tile | Single 3 dimensional point in a fluid solution |
| --- | --- |
| Encapsulated software module | Base element |
| API | Molecular surface |
| Messages | Valence fields |
| Rules | Physical response |

Figure 4:
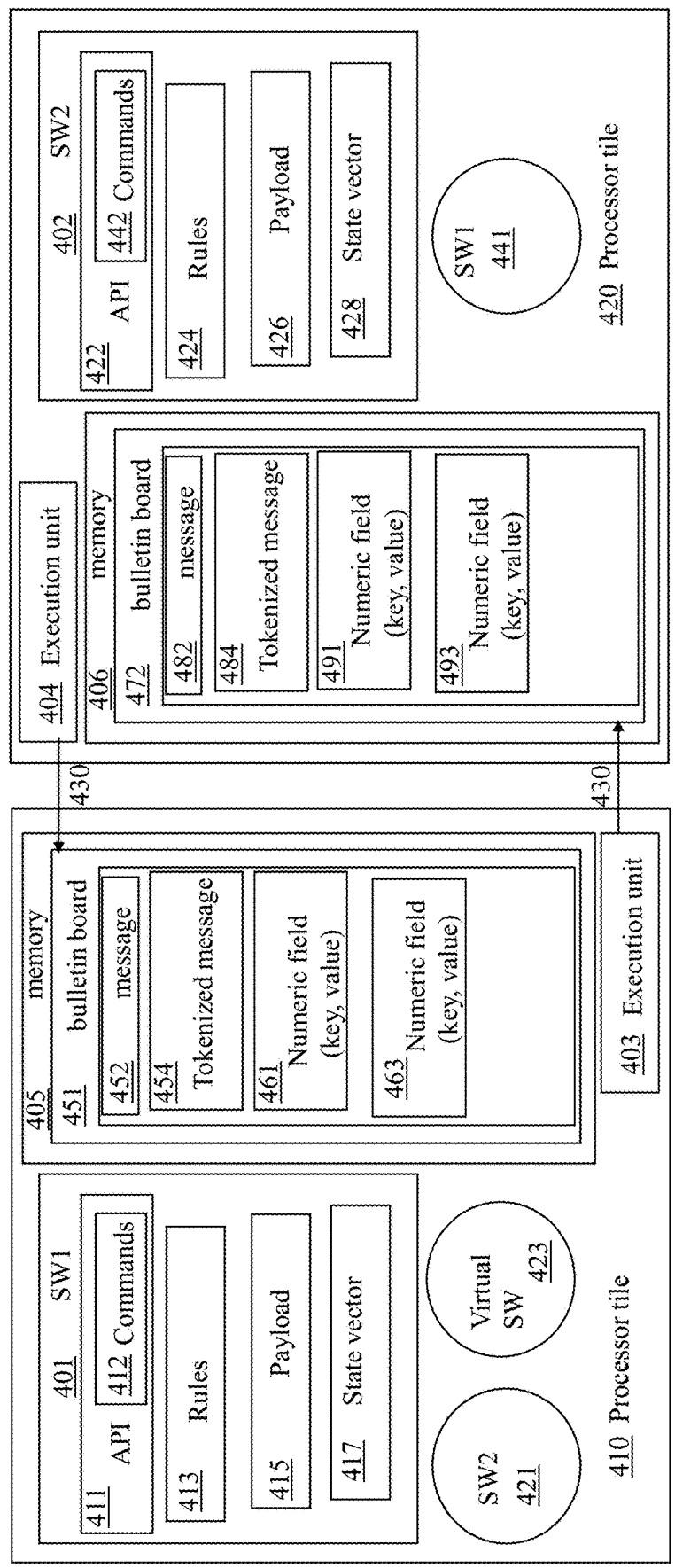
FIG. 4 illustrates an example processor tile to interact with an adjacent processor tile to perform functions of self-assembly by messages passing through bulletin boards, in accordance with various embodiments.

FIG. 4 illustrates an example processor tile, e.g., a processor tile 410, to interact with an adjacent processor tile, e.g., a processor tile 420, to perform functions of self-assembly by message passing through bulletin boards, in accordance with various embodiments. The processor tile 410 and the processor tile 420 may be an example of the processor tile 101, or any other processor tile of the computational device 100 shown in FIG. 1, the processor tile 221, or any other processor tile of the computational device 220 shown in FIG. 2, or the processor tile 300 as shown in FIG. 3. The processor tile 410 is coupled to the processor tile 420 by an interconnect 430, similar to the processor tile 101 coupled to the processor tile 107 by the interconnect 141 as shown in FIG. 1.

In embodiments, the processor tile 410 may include a memory 405, an execution unit 403 coupled to the memory 405, and an encapsulated software module 401 to be executed by the execution unit 403. The encapsulated software module 401 may include an API 411, where the API 411 may include commands 412 to communicate with the execution unit 403 or to communicate with other processor tiles, e.g., the processor tile 420. The encapsulated software module 401 may further include a set of rules 413, a payload 415, and a state vector 417. Multiple encapsulated software modules, e.g., an encapsulated software module 421, or a virtual encapsulated software module 423, may be executed by the execution unit 403. The memory 405 may store the bulletin board 451 to hold a message 452, a tokenized message 454, a numeric field 461, and a numeric field 463. More messages or more numeric fields may be stored in the bulletin board 451. The encapsulated software module 401 may post and read a message, e.g., the message 452, at the bulletin board 451 stored in the memory 405.

In embodiments, the processor tile 420 may include a memory 406, an execution unit 404 coupled to the memory 406, and an encapsulated software module 402 to be executed by the execution unit 404. The encapsulated software module 402 may include an API 422, where the API 422 may include commands 442 to communicate with the execution unit 404 or to communicate with other processor tiles, e.g., the processor tile 410. The encapsulated software module 402 may further include a set of rules 424, a payload 426, and a state vector 428. Multiple encapsulated software modules, e.g., an encapsulated software module 441, may be executed by the execution unit 404. The memory 406 may store a bulletin board 472 to hold a message 482, a tokenized message 484, a numeric field 491, and a numeric field 493. More messages or more numeric fields may be stored in the bulletin board 472. The encapsulated software module 402 may post and read a message, e.g., the message 482, at the bulletin board 472 stored in the memory 406. In addition, the encapsulated software module 402 may read the bulletin board 451 of the processor tile 410, and the encapsulated software module 401 may read the bulletin board 472 of the processor tile 420, so that messages may be passed between the processor tile 410 and the processor tile 420.

In embodiments, the encapsulated software module 401 may perform functions of self-assembly by message passing through bulletin boards, e.g., the bulletin board 451 and the bulletin board 472 of the adjacent processor tile 420. In detail, the encapsulated software module 401, in response to execution by the execution unit 403, may select the processor tile 420 from one or more adjacent processor tiles of the processor tile 410, to be a part of a signal pathway, based at least in part on a selection criterion of the signal pathway. The encapsulated software module 401 may make the selection based on the message 452 held in the bulletin board 451, or the message 482 held in the bulletin board 472, while applying a selection criterion for the signal pathway. The selection criterion for the signal pathway may be based on a relationship between the processor tile 410 and other adjacent processor tiles, e.g., the processor tile 420, defined by a congestion, a distance, a load balance, a heat energy, or a boundary limit.

In embodiments, the encapsulated software module 401 in the processor tile 410 may be different or perform functions different from the encapsulated software module 402 in the processor tile 420. The encapsulated software module 401 may determine or detect that the processor tile 420 to be an unoccupied processor tile, when the processor tile 420 does not have a copy of the encapsulated software module 401. On detection of the unoccupied processor file, the encapsulated software module 401 may clone a copy of itself to be placed into the processor tile 420 to make the processor tile 420 an occupied processor tile. The cloning of the encapsulated software module 401 may be accomplished by generating a tokenized message of the encapsulated software module 401, e.g., the tokenized message 454, placing the tokenized message in the bulletin board 451, where the processor tile 420 may read the bulletin board 451 for the tokenized message 454. The processor tile 420 may further make a copy of the tokenized message 454 to become the tokenized message 484 stored in the bulletin board 472, and further instantiate the encapsulated software module 401 to become the encapsulated software module 441, by processing the tokenized message 484 on the processor tile 420.

In embodiments, the encapsulated software module 441, which may be a cloned copy of the encapsulated software module 401 in the occupied processor tile, e.g., the processor tile 420, may generate the numeric field 493 on the processor 420, and the numeric field 493 may be updated from the numeric field 461 of the processor tile 410.

In embodiments, the encapsulated software module 401 may compute the numerical field 463, based on the numerical field 493 of the processor tile 420, and other adjacent processor tiles, when the encapsulated software module 401 does not detect an unoccupied processor tile among the plurality of processor tiles.

Figure 5:
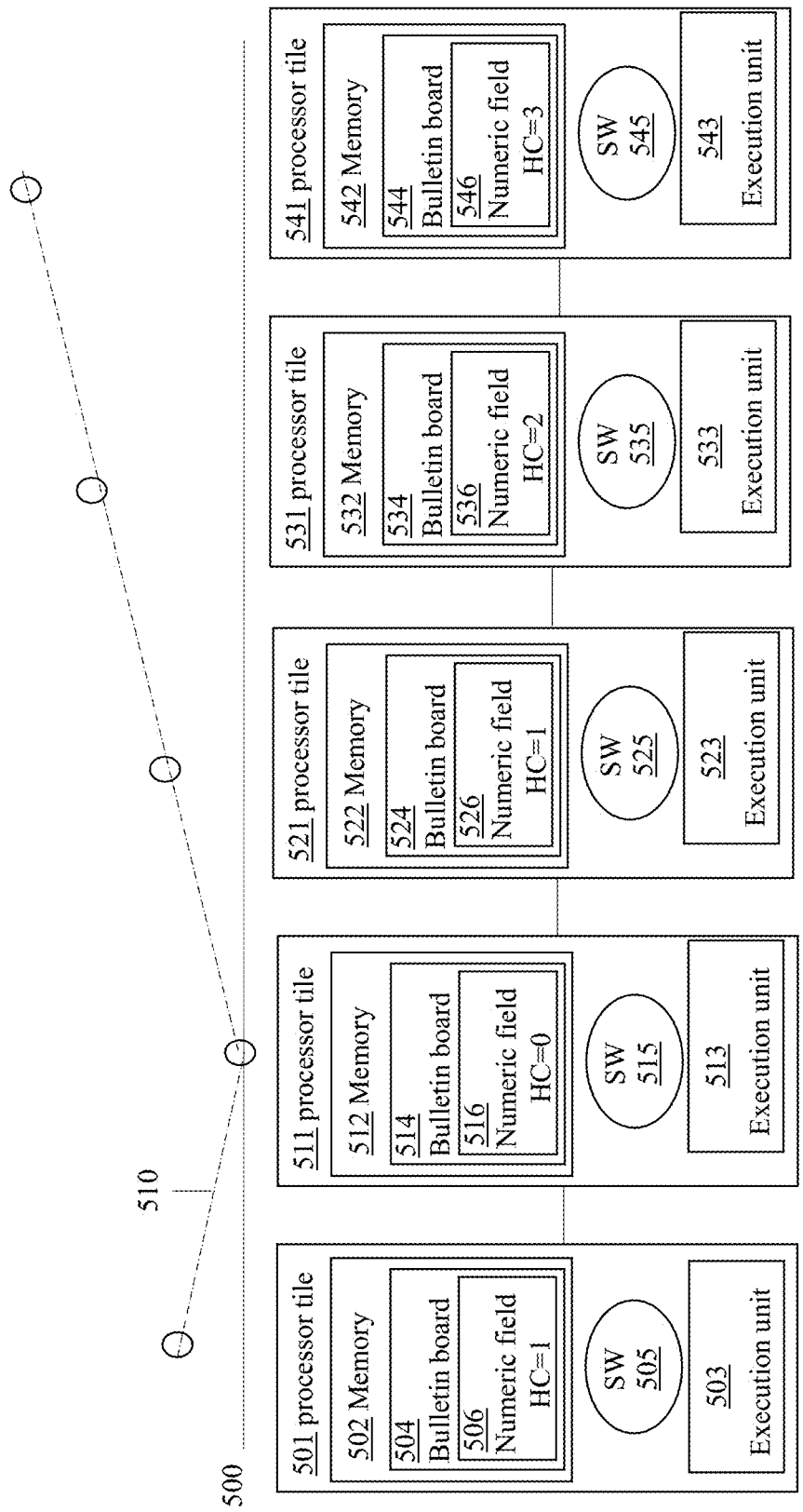
FIG. 5 illustrates an example signal pathway between two processor tiles including multiple intermediate processor tiles, where a processor tile includes a numeric field, in accordance with various embodiments.

FIG. 5 illustrates an example signal pathway 500 between two processor tiles, e.g., a processor tile 501, and a processor tile 541, including multiple intermediate processor tiles, where a processor tile includes a numeric field, in accordance with various embodiments. The processor tile 501 and the processor tile 541 may be an example of the processor tile 101 and the processor tile 103, or any other two processor tiles of the computational device 100 shown in FIG. 1, the processor tile 221 and the processor tile 223, or any other two processor tiles of the computational device 220 shown in FIG. 2, or the processor tile 300 as shown in FIG. 3.

In embodiments, the signal pathway 500 may include the processor tile 501 and the processor tile 541, with intermediate processor tiles, e.g., a processor tile 511, a processor tile 521, and a processor tile 531. The processor tile 501 may include a memory 502, an execution unit 503 coupled to the memory 502, and an encapsulated software module 505 to be executed by the execution unit 503. The encapsulated software module 505 may include various components, e.g., an API, commands, a set of rules, a payload, or a state vector, not shown. The memory 502 may store a bulletin board 504 to hold a numeric field 506. More messages or more numeric fields may be stored in the bulletin board 504, not shown. The numeric field 506 may include a hop count equal to 1.

In embodiments, the processor tile 511 may include a memory 512, an execution unit 513 coupled to the memory 512, and an encapsulated software module 515 to be executed by the execution unit 513. The encapsulated software module 515 may include various components, e.g., an API, commands, a set of rules, a payload, or a state vector, not shown. The memory 512 may store a bulletin board 514 to hold a numeric field 516. More messages or more numeric fields may be stored in the bulletin board 514, not shown. The numeric field 516 may include a hop count equal to 0.

In embodiments, the processor tile 521 may include a memory 522, an execution unit 523 coupled to the memory 522, and an encapsulated software module 525 to be executed by the execution unit 523. The encapsulated software module 525 may include various components, e.g., an API, commands, a set of rules, a payload, or a state vector, not shown. The memory 522 may store a bulletin board 524 to hold a numeric field 526. More messages or more numeric fields may be stored in the bulletin board 524, not shown. The numeric field 526 may include a hop count equal to 1.

In embodiments, the processor tile 531 may include a memory 532, an execution unit 533 coupled to the memory 532, and an encapsulated software module 535 to be executed by the execution unit 533. The encapsulated software module 535 may include various components, e.g., an API, commands, a set of rules, a payload, or a state vector, not shown. The memory 532 may store a bulletin board 534 to hold a numeric field 536. More messages or more numeric fields may be stored in the bulletin board 534, not shown. The numeric field 536 may include a hop count equal to 2.

In embodiments, the processor tile 541 may include a memory 542, an execution unit 513 coupled to the memory 542, and an encapsulated software module 545 to be executed by the execution unit 543. The encapsulated software module 545 may include various components, e.g., an API, commands, a set of rules, a payload, or a state vector, not shown. The memory 542 may store a bulletin board 544 to hold a numeric field 546. More messages or more numeric fields may be stored in the bulletin board 544, not shown. The numeric field 546 may include a hop count equal to 3.

In embodiments, a numeric field of a processor tile may be regarded as a discrete sample of an one-dimensional function sampled at the processor tile. For example, the numeric field 506 with a value 1, the numeric field 516 with a value 0, the numeric field 526 with a value 1, the numeric field 536 with a value 2, and the numeric field 546 with a value 3, may be a discrete sample of a function 510 sampled at the processor tile 501, the processor tile 511, the processor tile 521, the processor tile 531, and the processor tile 541, respectively. The encapsulated software module, e.g., the encapsulated software module 505, the encapsulated software module 515, the encapsulated software module 525, the encapsulated software module 535, the encapsulated software module 545, may perform spatial optimizations on these numeric fields to guide their migration and sequencing of the signal pathway 500. The encapsulated software modules may manage the formation of the signal pathway 500 via locally visible message posts in the bulletin boards, e.g., the bulletin board 504, the bulletin board 514, the bulletin board 524, the bulletin board 534, or the bulletin board 544.

FIGS. 6-9 illustrate an example process 600 for forming a signal pathway 610 between two processor tiles, e.g., a processor tile 601, and a processor tile 641, including multiple intermediate processor tiles, where a processor tile includes a numeric field, in accordance with various embodiments. The processor tile 601 and the processor tile 641 may be an example of the processor tile 101 and the processor tile 103, or any other two processor tiles of the computational device 100 shown in FIG. 1, the processor tile 221 and the processor tile 223, or any other two processor tiles of the computational device 220 shown in FIG. 2. In addition, each processor tile of the signal pathway 610, e.g., the processor tile 601, a processor tile 611, a processor tile 621, a processor tile 631, and the processor tile 641, may be similar to the processor tile 300 shown in FIG. 3.

In embodiments, the signal pathway 610 may include the processor tile 601 and the processor tile 641, with intermediate processor tiles, e.g., the processor tile 611, the processor tile 621, and the processor tile 631. The processor tile 601 may include a memory 602, and an execution unit 603 coupled to the memory 602. The memory 602 may store a bulletin board 604 to store messages or numeric fields. The processor tile 611 may include a memory 612, and an execution unit 613 coupled to the memory 612. The memory 612 may store a bulletin board 614 to store messages or numeric fields. The processor tile 621 may include a memory 622, and an execution unit 623 coupled to the memory 622. The memory 622 may store a bulletin board 624 to store messages or numeric fields. The processor tile 631 may include a memory 632, and an execution unit 633 coupled to the memory 632. The memory 632 may store a bulletin board 634 to store messages or numeric fields. The processor tile 641 may include a memory 642, and an execution unit 643 coupled to the memory 642. The memory 642 may store a bulletin board 644 to store messages or numeric fields.

Figure 6:
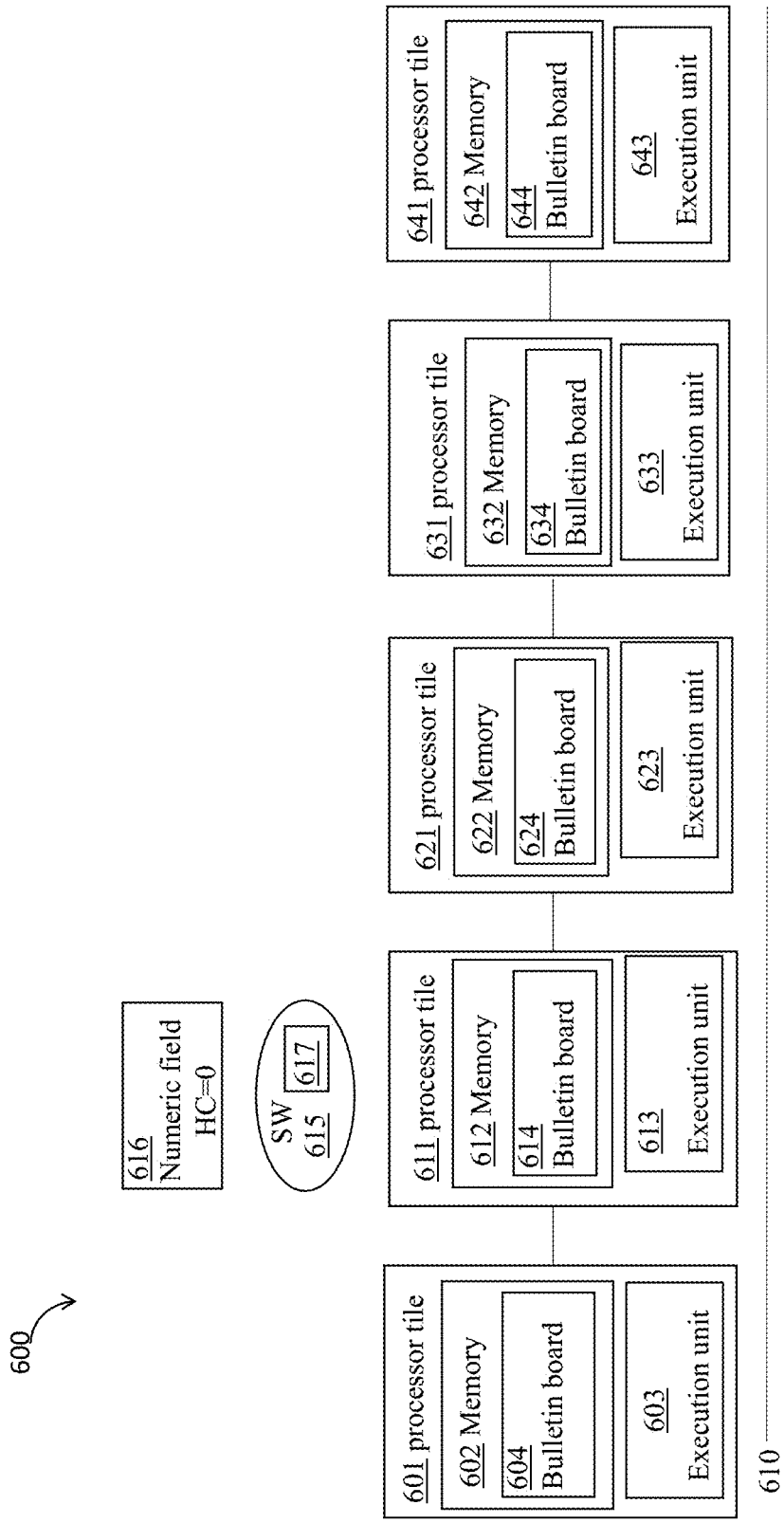
FIGS. 6-9 illustrate an example process for forming a signal pathway between two processor tiles including multiple intermediate processor tiles, where a processor tile includes a numeric field, in accordance with various embodiments.

As shown in FIG. 6, an encapsulated software module 615 may be inserted into the processor tile 611. The encapsulated software module 615 may be inserted by an external agency. In some embodiments, the external agency may be an agency responsible for the formation of a signal pathway. The encapsulated software module 615 may post a numeric field 616 with a hop count value to be 0. In addition, the encapsulated software module 615 may include a set of rules 617. For example, the set of rules 617 may include the following rules specifying a response to one or more messages held in the bulletin board.

| | |
|---|---|
| Update hop count (HC) | Update the HC post to local-minimum + 1. |
| Propagation | If an unoccupied adjacent processor tile is found, place a copy of the encapsulated software module to be transferred to the adjacent processor tile. |

-continued

| | |
|---|---|
| Update hop count (HC) | Update the HC post to local-minimum + 1. |
| Estimate distance (D) | Compute a fractional average of HCs based on all adjacent processor tiles. |

Based on the set of rules 617, the encapsulated software module 615 may post the numerical field 616 to the bulletin board 614, where the numerical field 616 may have a key-value pair as HC=0. In addition, the encapsulated software module 615 may scan all adjacent processor tiles to find any adjacent processor tiles that do not have a copy of the encapsulated software module 615. The encapsulated software module 615 may scan all adjacent processor tiles by checking the bulletin boards of the adjacent processor tiles. For example, the encapsulated software module 615 may detect that the processor tile 601 does not contain a copy of the encapsulated software module 615. After detecting the processor tile 601 does not contain a copy of the encapsulated software module 615, the encapsulated software module 615 may clone a copy of itself and uses its API to queue the copied encapsulated software module 615 for transfer to the unpopulated adjacent processor tile 601.

Figure 7:
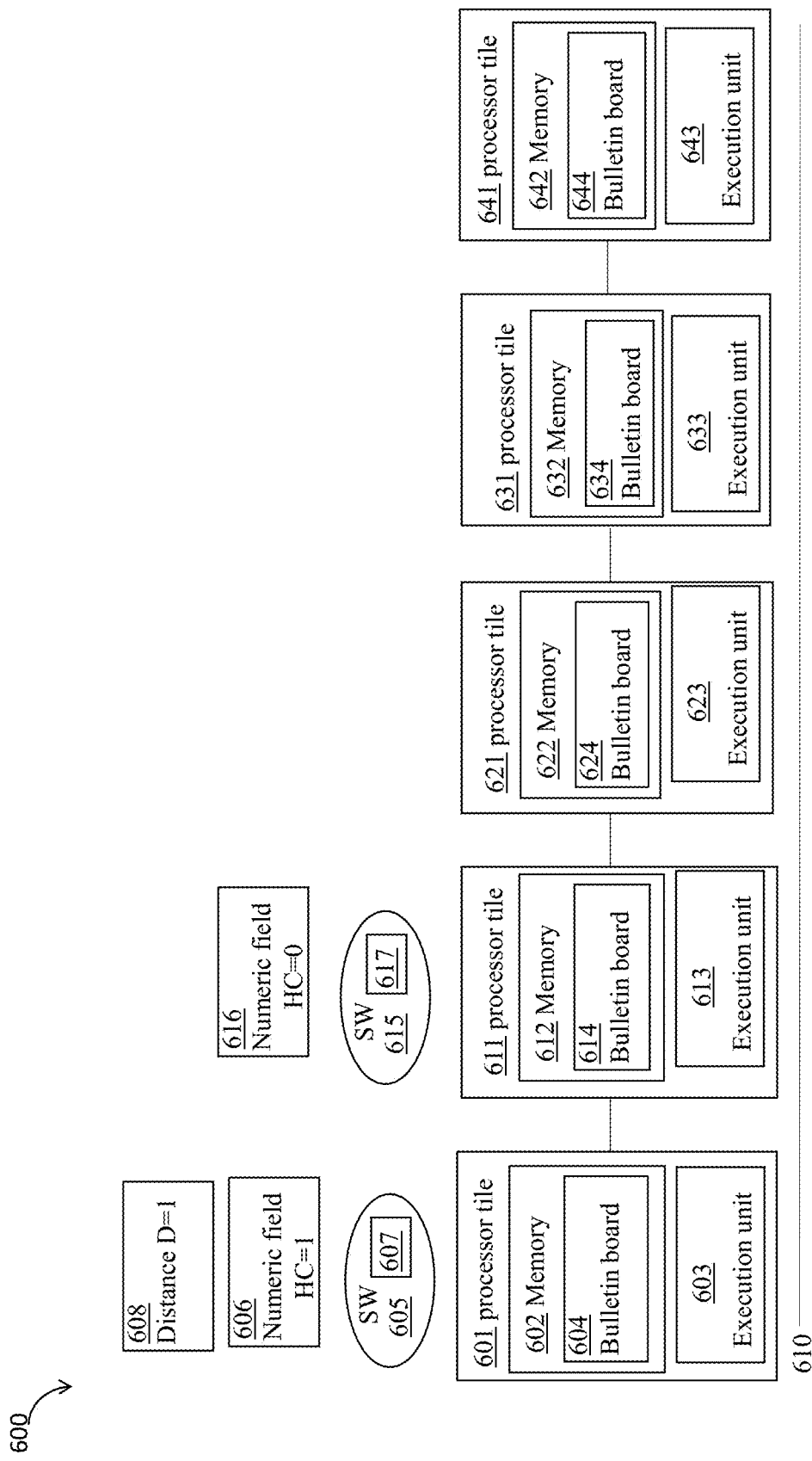

As shown in FIG. 7, the cloned copy of the encapsulated software module 615 may enter the processor tile 601, to be an encapsulated software module 605 with a set of rules 607. The encapsulated software module 605 may compute its own hop count as an increment of the smallest visible hop count, and format the updated hop count in a numeric field 606 with a value as 1. In addition, according to the rule of estimating distance (D), the encapsulated software module 605 may compute a second numeric field 608 with a real-valued distance, computed by averaging all the integer hop counts that it can detect. Since the processor tile 611 may be the only processor tile the encapsulated software module 605 may detect, and the integer hop count of the processor tile 611 is 1, the encapsulated software module 605 may compute a second numeric field as D=1.

Figure 8:
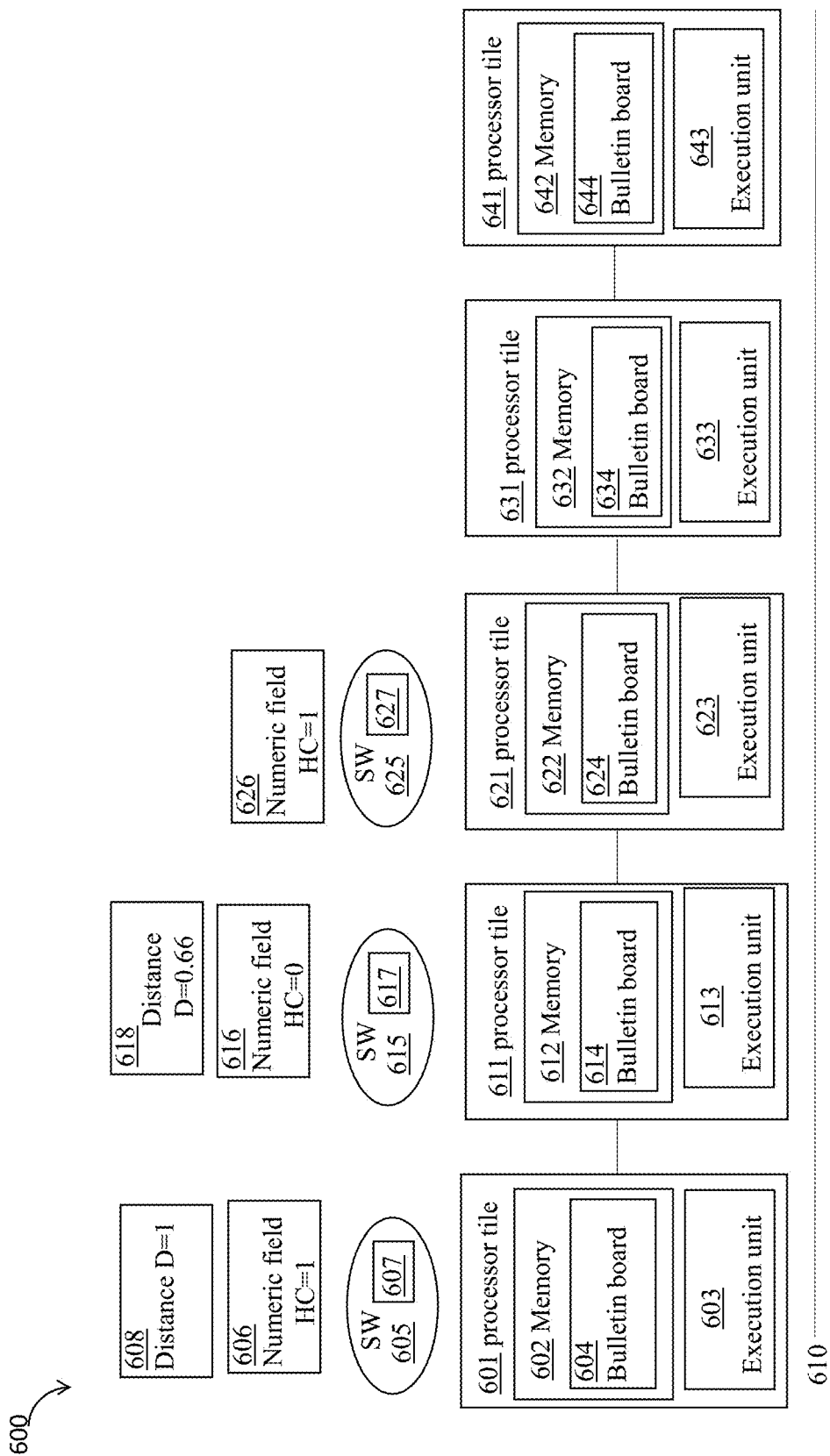

As shown in FIG. 8, the encapsulated software module 615 may scan all adjacent processor tiles by checking the bulletin boards of the adjacent processor tiles, and may detect that the processor tile 621 does not contain a copy of the encapsulated software module 615. Afterwards, the encapsulated software module 615 may clone a copy of itself and uses its API to queue the copied encapsulated software module 615 for transfer to the unpopulated adjacent processor tile 621. The cloned copy of the encapsulated software module 615 may enter the processor tile 621, to be an encapsulated software module 625 with a set of rules 627. The encapsulated software module 625 may compute its own hop count as an increment of the smallest visible hop count, and format the updated hop count in a numeric field 626 with a value as 1.

Figure 9:
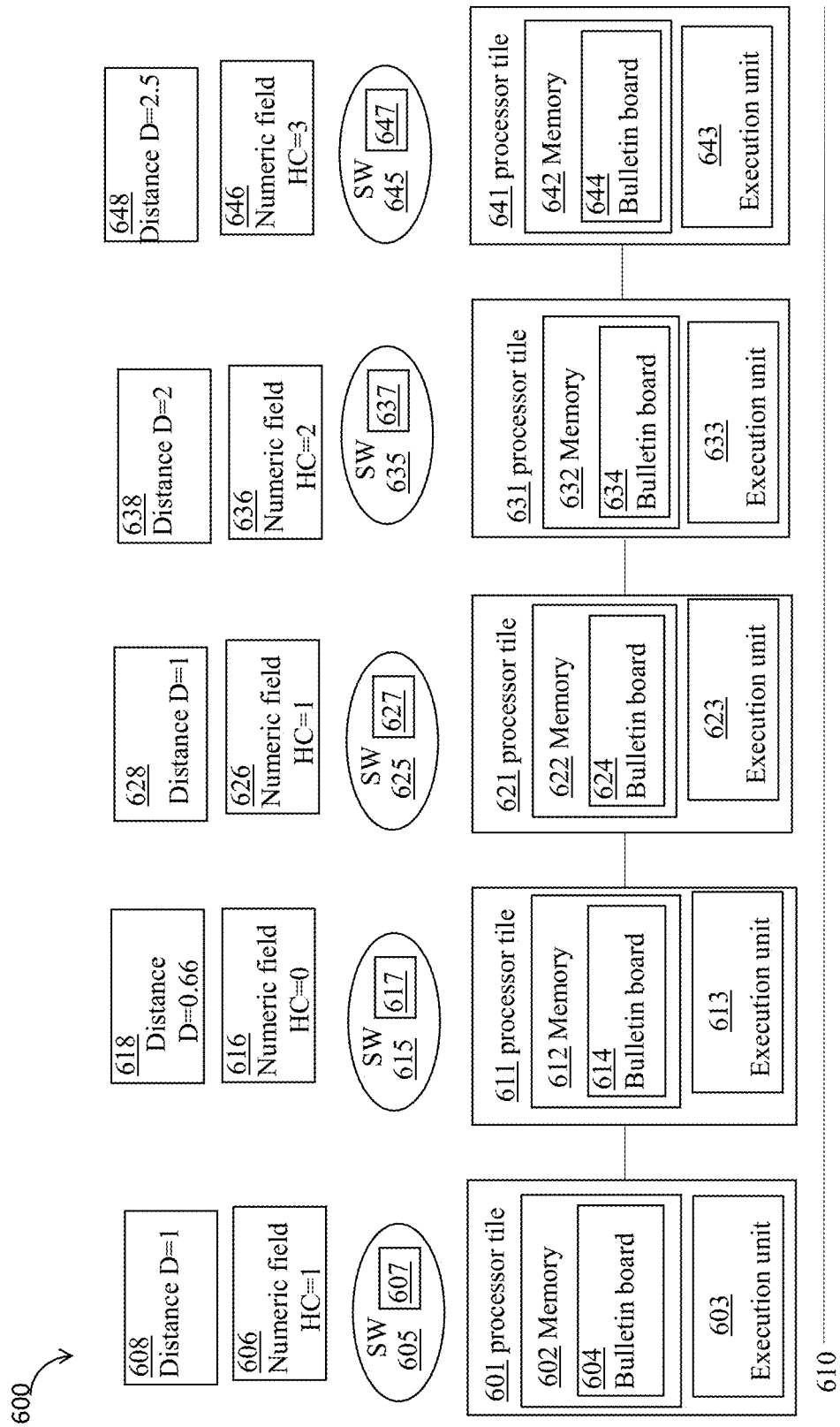

As shown in FIG. 9, the encapsulated software module 625 may scan all adjacent processor tiles by checking the bulletin boards of the adjacent processor tiles, and may detect that the processor tile 631 does not contain a copy of the encapsulated software module 625. Afterwards, the encapsulated software module 625 may clone a copy of itself and uses its API to queue the copied encapsulated software module 625 for transfer to the unpopulated adjacent processor tile 631. The cloned copy of the encapsulated software module 625 may enter the processor tile 631, to be an encapsulated software module 635 with a set of rules 637. The encapsulated software module 635 may compute its own hop count as an increment of the smallest visible hop count, and format the updated hop count in a numeric field 636 with a value as 2, incremented by 1 from the value of the numeric field 626.

Similarly, the encapsulated software module 635 may scan all adjacent processor tiles by checking the bulletin boards of the adjacent processor tiles, and may detect that the processor tile 641 does not contain a copy of the encapsulated software module 635. Afterwards, the encapsulated software module 635 may clone a copy of itself and uses its API to queue the copied encapsulated software module 635 for transfer to the unpopulated adjacent processor tile 641. The cloned copy of the encapsulated software module 635 may enter the processor tile 641, to be an encapsulated software module 645 with a set of rules 647. The encapsulated software module 645 may compute its own hop count as an increment of the smallest visible hop count, and format the updated hop count in a numeric field 646 with a value as 3, incremented by 1 from the value of the numeric field 636.

In addition, according to the rule of estimating distance (D), the encapsulated software module 625 may computes a second numeric field 628 with a real-valued distance, computed by averaging all the integer hop counts that it can detect. Since the processor tile 611 and the processor tile 631 may be the processor tiles the encapsulated software module 625 may detect, the integer hop count of the processor tile 611 is 0, and the integer hop count of the processor tile 631 is 2, the encapsulated software module 625 may compute a numeric field 628 as D=1. Similarly, the encapsulated software module 635 may calculate a numeric field 638 as D=2, which is an average of the HC=1 for the processor tile 621, and the HC=3 for the processor tile 641. Furthermore, the encapsulated software module 645 may calculate a numeric field 648 as D=2.5, which is an average of the HC=2 for the processor tile 631 and HC=3 for the processor tile 641. The encapsulated software module 615 may calculate a numeric field 618 D=0.66, which is an average of the HC=1 for the processor tile 621, HC=1 for the processor tile 601, and HC=0 for the processor tile 611.

Figure 10:
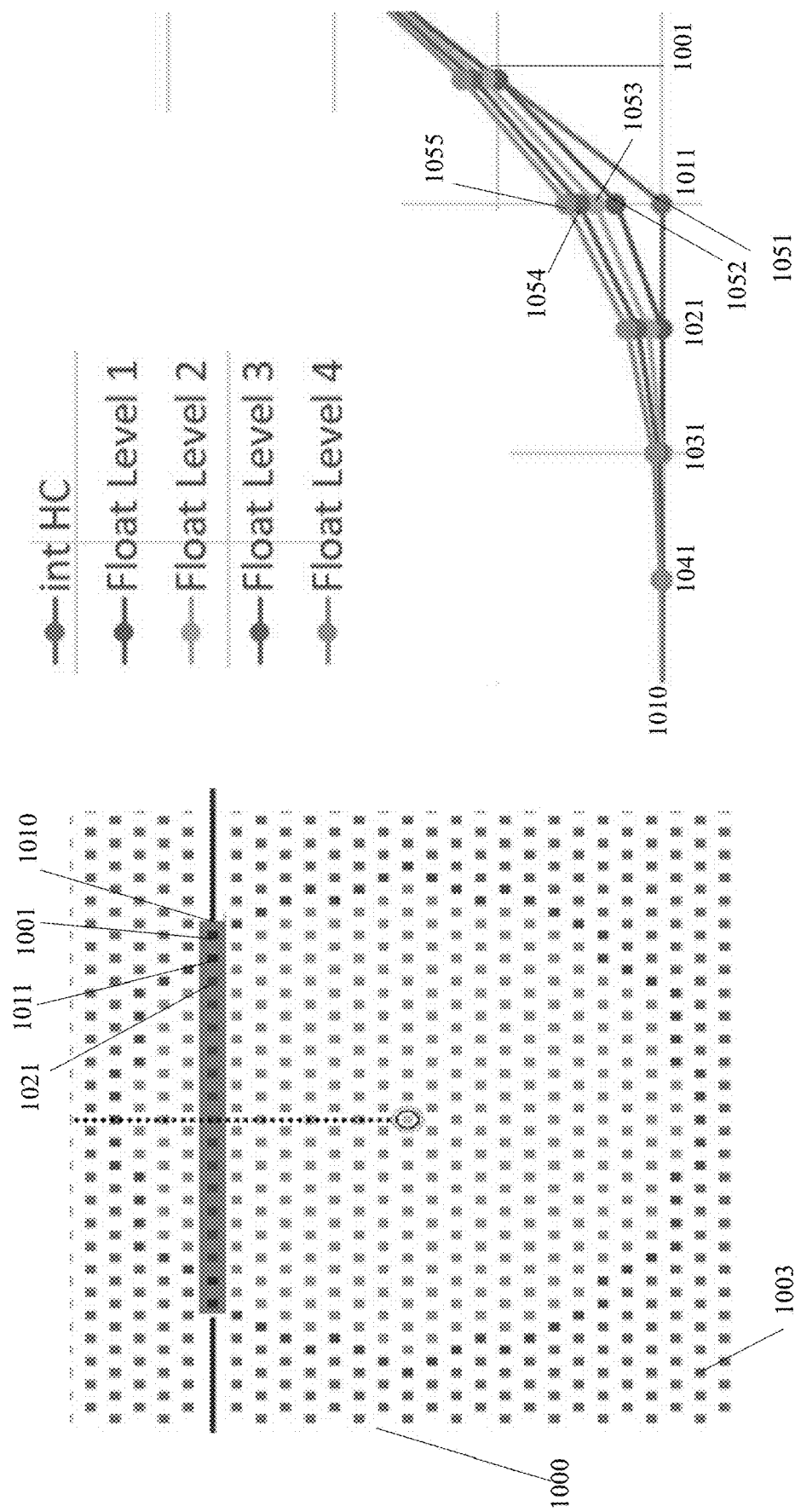
FIG. 10 illustrates an example computational device including a set of tiles having multiple processor tiles, where a processor tile includes a hierarchical numeric field and multiple levels of numeric fields, in accordance with various embodiments.

FIG. 10 illustrates an example computational device 1000 including a set of tiles 1010 having multiple processor tiles, e.g., a processor tile 1001, a processor tile 1011, a processor tile 1021, where a processor tile includes a hierarchical numeric field with multiple levels of numeric fields, in accordance with various embodiments. The processor tile 1001 may be an example of the processor tile 101, or any other processor tiles of the computational device 100 shown in FIG. 1, the processor tile 221, or any other processor tiles of the computational device 220 shown in FIG. 2. In addition, each processor tile of the signal pathway 1010, e.g., the processor tile 1001, a processor tile 1011, a processor tile 1021, a processor tile 1031, and the processor tile 1041, may be similar to the processor tile 300 shown in FIG. 3, while the signal pathway 1010 may be similar to the signal pathway 500 shown in FIG. 5, or the signal pathway 610 shown in FIGS. 6-9.

In embodiments, the computational device 1000 may include multiple processor tiles, e.g., a processor tile 1003, the processor tile 1001, the processor tile 1011, the processor tile 1021, the processor tile 1031, and the processor tile 1041. The computational device 1000 may include the signal pathway 1010 having the processor tile 1001, the processor tile 1011, the processor tile 1021, the processor tile 1031, and the processor tile 1041. Each processor tile of the signal pathway 1010 may include a copy of a same encapsulated software module, and a bulletin board having multiple numeric fields, as shown in FIGS. 6-9. For example, the processor tile 1011 may include five different levels of numeric fields, e.g., a numeric field 1051, a numeric field 1052, a numeric field 1053, a numeric field 1054, and a numeric field 1055. The numeric field 1051 may be a first level numeric field, and may be an initial hop count, as the HC value shown in FIGS. 6-9. In addition, the numeric field 1052 may be a second level numeric field, the numeric field 1053 may be a third level numeric field, the numeric field 1054 may be a fourth level numeric field, and the numeric field 1055 may be a fifth level numeric field. Each level numeric field may be computed based on previous levels of numeric fields. For example, a second level numeric field 1052 may be a float level 1, and may be computed for the processor tile 1011 by averaging all the locally visible values of the initial HC level for the processor tile 1011. Similarly, a nth level numeric field may be computed for the processor tile 1011 by averaging all the locally visible values from the (n−1)th level. The multiple different levels of numeric fields, e.g., the numeric field 1051, the numeric field 1052, the numeric field 1053, the numeric field 1054, and the numeric field 1055 may form an instance a hierarchical numeric field, organized in a hierarchy.

In embodiments, the multiple levels of numeric fields across multiple processor tiles, e.g., the processor tile 1001, the processor tile 1011, the processor tile 1021, the processor tile 1031, and the processor tile 1041 may form multiple functional curves or gradient fields. With increasing levels of the hierarchy, the function curves of the numeric fields may become piecewise differentiable, which may enable use of powerful distributed optimization functions whose convergence may depend on spatial continuity.

Figure 11:
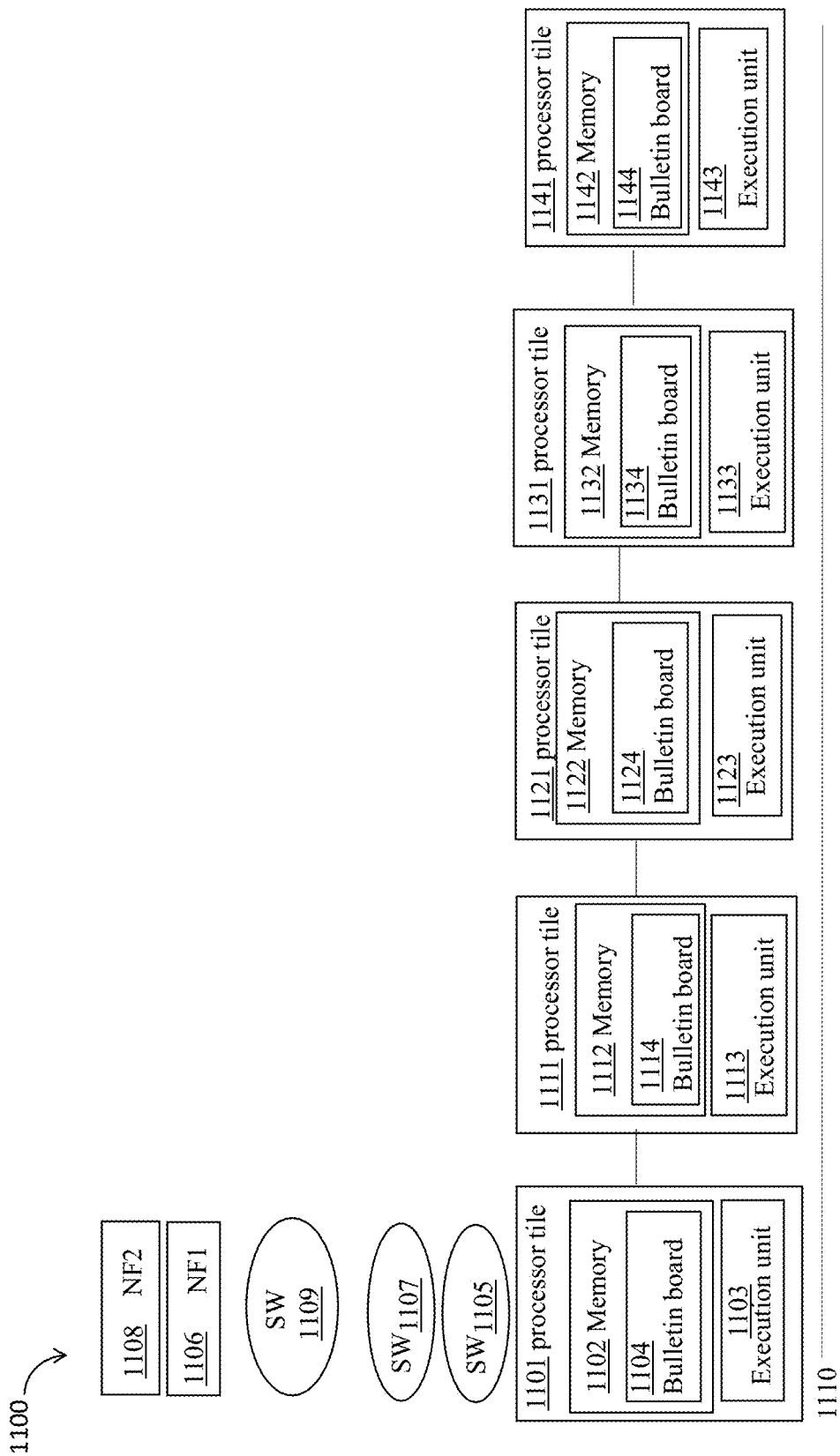
FIG. 11 illustrates an example signal pathway including multiple processor tiles, where a processor tile includes a hierarchical numeric field having multiple levels of numeric fields generated by multiple encapsulated software modules that are managed by a virtual encapsulated software module, in accordance with various embodiments.

FIG. 11 illustrates an example signal pathway 1110 including multiple processor tiles, e.g., a processor tile 1101, a processor tile 1111, a processor tile 1121, a processor tile 1131, and a processor tile 1141, where a processor tile includes a hierarchical numeric field having multiple levels of numeric fields generated by multiple encapsulated software modules that are managed by a virtual encapsulated software module, in accordance with various embodiments. The processor tile 1101 may be an example of the processor tile 101, or any other processor tiles of the computational device 100 shown in FIG. 1, the processor tile 221, or any other processor tiles of the computational device 220 shown in FIG. 2. In addition, each processor tile of the signal pathway 1110, e.g., the processor tile 1101, the processor tile 1111, the processor tile 1121, the processor tile 1131, and the processor tile 1141, may be similar to the processor tile 300 shown in FIG. 3, while the signal pathway 1110 may be similar to the signal pathway 500 shown in FIG. 5, or the signal pathway 610 shown in FIGS. 6-9.

In embodiments, the signal pathway 1110 may include the processor tile 1101 and the processor tile 1141, with intermediate processor tiles, e.g., the processor tile 1111, the processor tile 1121, and the processor tile 1131. The processor tile 1101 may include a memory 1102, and an execution unit 1103 coupled to the memory 1102. The memory 1102 may store a bulletin board 1104 to store messages or numeric fields. The processor tile 1111 may include a memory 1112, and an execution unit 1113 coupled to the memory 1112. The memory 1112 may store a bulletin board 1114 to store messages or numeric fields. The processor tile 1121 may include a memory 1122, and an execution unit 1123 coupled to the memory 1122. The memory 1122 may store a bulletin board 1124 to store messages or numeric fields. The processor tile 1131 may include a memory 1132, and an execution unit 1133 coupled to the memory 1132. The memory 1132 may store a bulletin board 1134 to store messages or numeric fields. The processor tile 1141 may include a memory 1142, and an execution unit 1143 coupled to the memory 1142. The memory 1142 may store a bulletin board 1144 to store messages or numeric fields.

In embodiments, the processor tile 1101 may further include an encapsulated software module 1105 that generates a numeric field 1106, an encapsulated software module 1107 that generates a numeric field 1108. In embodiments, there may be relationships between the numeric field 1106 and the numeric field 1108. For example, the numeric field 1108 may be calculated based on a formula $1/(1+x)$, where the variable x may be the value of the numeric field 1106. The numeric field 1106 and the numeric field 1108 may form a hierarchal numeric field.

In addition, the processor tile 1101 may include a virtual encapsulated software module 1109 to manage the executions of the encapsulated software module 1105 and the encapsulated software module 1107. For example, the virtual encapsulated software module 1109 may interleave execution of the encapsulated software module 1105 and the encapsulated software module 1107 by time-shared processing on the execution unit 1103.

The encapsulated software module 1105, the encapsulated software module 1107, and the virtual encapsulated software module 1109 may be cloned from the processor tile 1101 into the processor tile 1111, the processor tile 1121, the processor tile 1131, and the processor tile 1141, respectively. Multiple numeric fields and a hierarchal numeric field may be generated accordingly. The details of the cloning of the encapsulated software modules and the numeric fields in other processor tiles are not shown.

Figure 12:
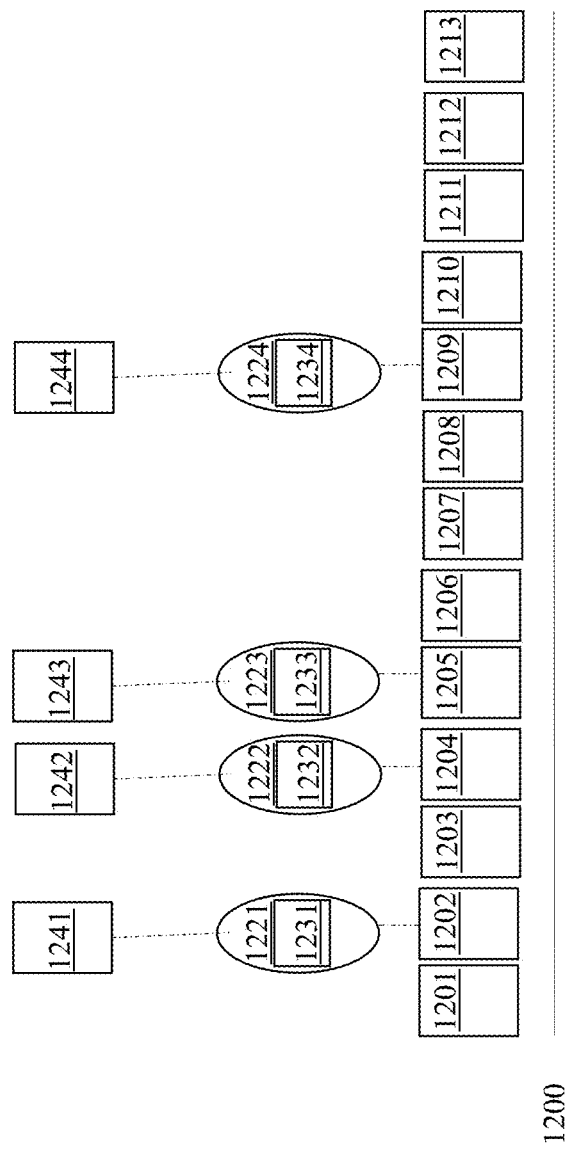
FIGS. 12-13 illustrate an example array of tiles, each with a direct network connection to its two nearest neighbors, to perform operations by encapsulated software modules to distribute multiple end points, in accordance with various embodiments.
Figure 13:
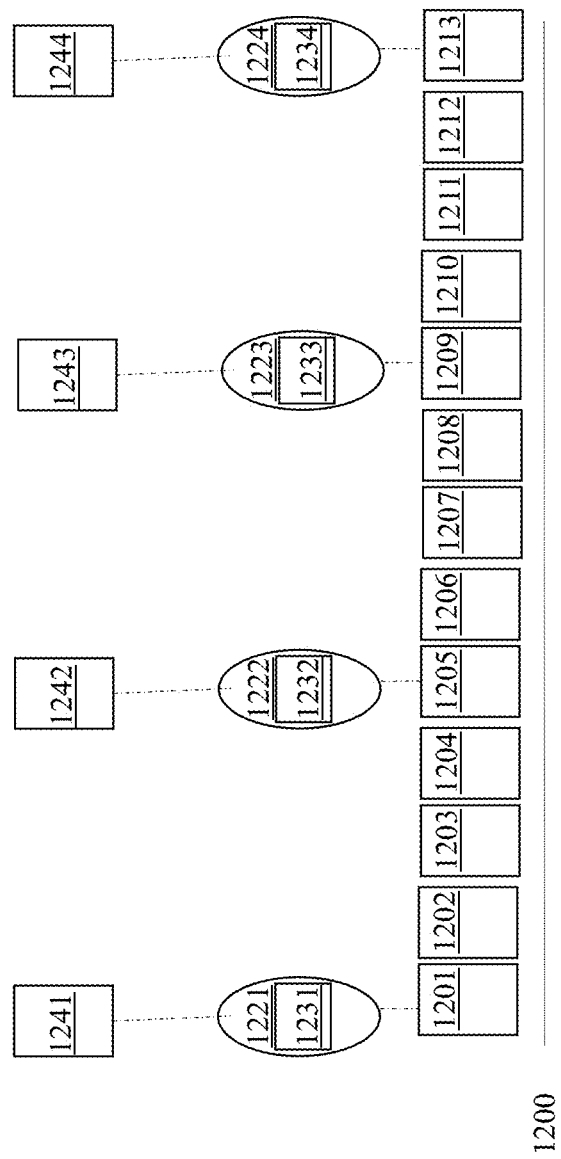

FIGS. 12-13 illustrate an example array 1200 of tiles, each with a direct network connection to its two nearest neighbors, to perform operations by encapsulated software modules to distribute multiple end points, in accordance with various embodiments. The processor tile 1201, or other processor tiles of the array 1200, may be an example of the processor tile 101, or any other processor tiles of the computational device 100 shown in FIG. 1, the processor tile 221, or any other processor tiles of the computational device 220 shown in FIG. 2. In addition, each processor tile of the array 1200, e.g., the processor tile 1201, a processor tile 1202, a processor tile 1203, a processor tile 1204, a processor tile 1205, a processor tile 1206, a processor tile 1207, a processor tile 1208, a processor tile 1209, a processor tile 1210, a processor tile 1211, a processor tile 1212, a processor tile 1213, may be similar to the processor tile 300 shown in FIG. 3, while the signal pathway 1110 may be similar to the signal pathway 500 shown in FIG. 5, or the signal pathway 610 shown in FIGS. 6-9.

In embodiments, as shown in FIG. 12, operations may be performed by encapsulated software modules to distribute four end points evenly. To start, four endpoints may be embedded into processor tiles randomly as encapsulated software modules with the coded endpoint operations. For example, an encapsulated software module 1221 may be embedded into a processor tile 1202, with an endpoint operation 1231 as a payload to generate a numeric field 1241; an encapsulated software module 1222 may be embedded into a processor tile 1204, with an endpoint operation 1232 as a payload to generate a numeric field 1242; an encapsulated software module 1223 may be embedded into a processor tile 1205, with an endpoint operation 1233 as a payload to generate a numeric field 1243; and an encapsulated software module 1224 may be embedded into a processor tile 1209, with an endpoint operation 1234 as a payload to generate a numeric field 1244. The beginning positions of the encapsulated software module 1221, the encapsulated software module 1222, the encapsulated software module 1223, the encapsulated software module 1224, may be randomly chosen, as shown to be the processor tile 1202, the processor tile 1204, the processor tile 1205, and the processor tile 1209.

In embodiments, per their internalized set of rules, each of the encapsulated software module 1221, the encapsulated software module 1222, the encapsulated software module 1223, the encapsulated software module 1224, may model the 'energy field strength' of a processor tile as a sum of the numeric field values from the other encapsulated software modules. At run time, each of the encapsulated software modules may post a message on its bulletin board that initiates a gradient radiating outward from its current location. At each local, e.g., unsynchronized time step, each of the encapsulated software modules may compute the energy field strength at its host processor tile and the energy of the one or two neighboring processor tiles. In addition to the energy field strength, the encapsulated software module may carry tag data that can identify the source of the encapsulated software module. As processing proceeds, the encapsulated software modules may use messages posted on the locally visible bulletin board to compute the cumulative energy field strength at their current processor tiles and at the immediately neighboring processor tiles. Migrating in a minimum energy direction may result in a uniform spatial distribution, regardless of initial position for the encapsulated software module.

In embodiments, as shown in FIG. 13, by using energy field strength to guide their migration, the encapsulated software modules may migrate and end up in the final placement shown. In detail, the encapsulated software module 1221 may end in the processor tile 1201; the encapsulated software module 1222 may end in the processor tile 1205; the encapsulated software module 1223 may end in the processor tile 1209; and the encapsulated software module 1224 may end in the processor tile 1213, which are evenly distributed with three processor tiles separating any two encapsulated software modules. In embodiments, operations may be performed by encapsulated software modules to distribute four end points evenly, regardless of the initial positions of the encapsulated software modules.

Figure 14:
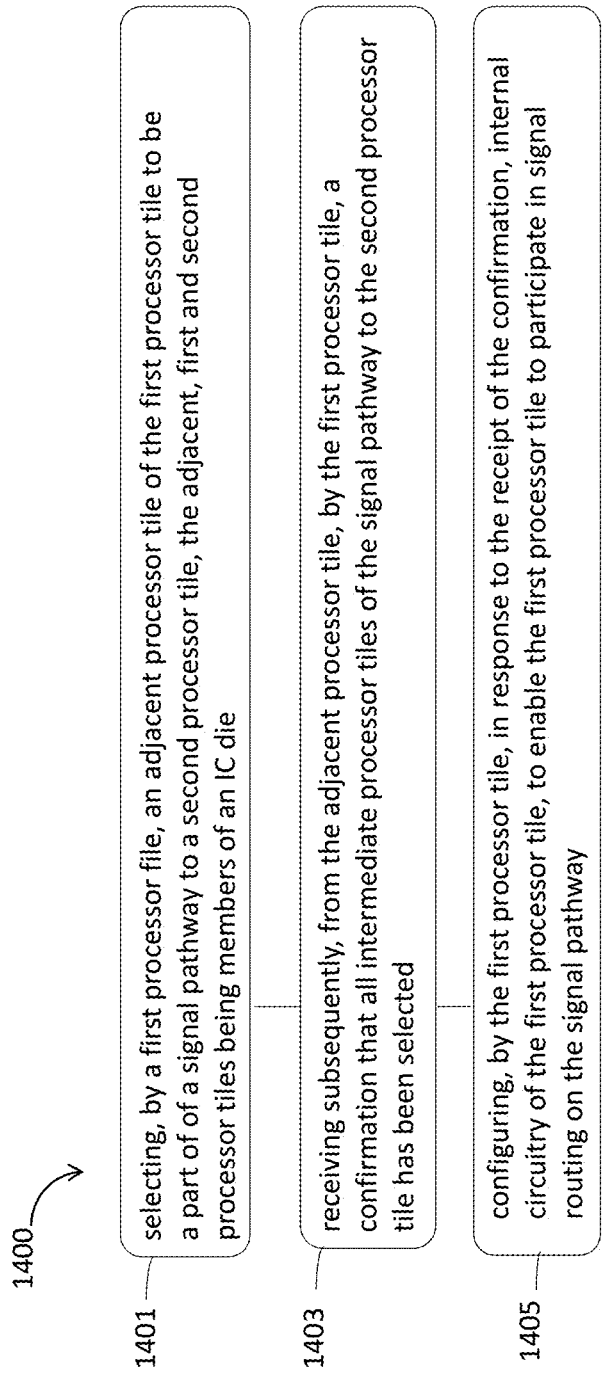
FIG. 14 illustrates an example process for configuring a signal pathway on an integrated circuit (IC) die, in accordance with various embodiments.

FIG. 14 illustrates an example process 1400 for configuring a signal pathway on an integrated circuit (IC) die, in accordance with various embodiments. In embodiments, the process 1400 may be a process performed by the processor tile 101, or any other processor tiles of the computational device 100 shown in FIG. 1, the processor tile 221, or any other processor tiles of the computational device 220 shown in FIG. 2, the processor tile 300 shown in FIG. 3, the processor tile 410 shown in FIG. 4, or any other processor tiles shown in FIGS. 1-13.

The process 1400 may start at an interaction 1401. During the interaction 1401, a first processor tile may select an adjacent processor tile of the first processor tile to be a part of a signal pathway to a second processor tile, where the first processor tile, the adjacent processor tile, and the second processor tiles are members of an IC die. For example, at the interaction 1401, the processor tile 101 may select the processor tile 107 adjacent to the processor tile 101 to be a part of the signal pathway 110 to the processor tile 103. The processor tile 101 may be similar to the processor tile 300 and may include an encapsulated software module. The processor tile 107 adjacent to the processor tile 101 may be selected by the encapsulated software module, based on a selection criterion for the signal pathway 110.

During an interaction 1403, the first processor tile may receive subsequently, from the adjacent processor tile, a confirmation that all intermediate processor tiles of the signal pathway to the second processor tile has been selected. For example, at the interaction 1403, the processor tile 101 may receive subsequently, from the processor tile 107 processor tile 101, a confirmation that all intermediate processor tiles of the signal pathway 110 to the processor tile 103 has been selected.

During an interaction 1405, the first processor tile may configure, in response to the receipt of the confirmation, internal circuitry of the first processor tile, to enable the first processor tile to participate in signal routing on the signal pathway. For example, at the interaction 1405, the processor tile 101 may configure, in response to the receipt of the confirmation, internal circuitry of the processor tile 101, to enable the processor tile 101 to participate in signal routing on the signal pathway 110.

Figure 15:
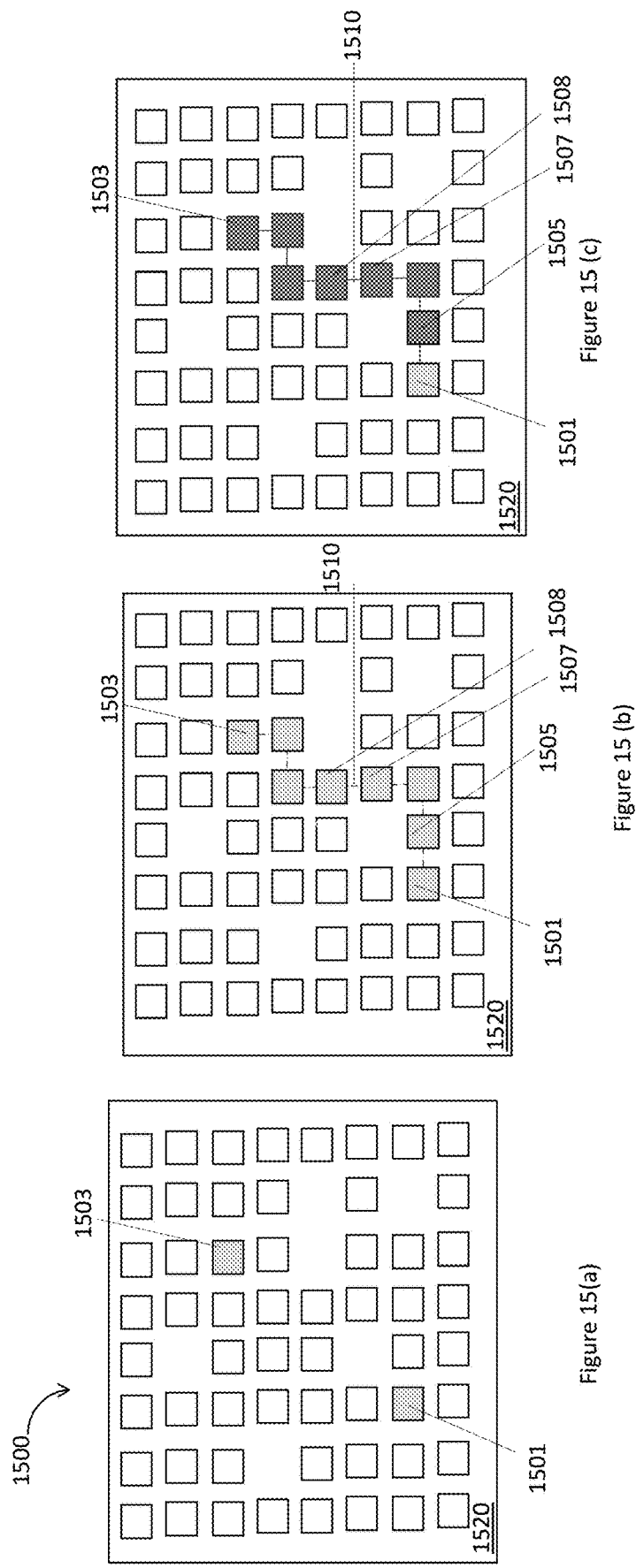
FIGS. 15($a$)-($c$) illustrate another example process for configuring a signal pathway on an IC die, in accordance with various embodiments.

FIGS. 15(a)-(c) illustrate an example process 1500 for configuring a signal pathway 1510 on an IC die 1520, in accordance with various embodiments. In embodiments, any processor tile of the IC die 1520 may be similar to the processor tile 101, or any other processor tiles of the computational device 100 shown in FIG. 1, the processor tile 221, or any other processor tiles of the computational device 220 shown in FIG. 2, the processor tile 300 shown in FIG. 3, the processor tile 410 shown in FIG. 4, or any other processor tiles shown in FIGS. 1-13. The processor 1500 may be an example of the process 1400 shown in FIG. 14.

In embodiments, as shown in FIG. 15(a), two end points of the signal pathway 1510 may be selected, as a processor tile 1501 and a processor tile 1503. The processor tile 1501 may be a starting point for the signal pathway 1510.

In embodiments, as shown in FIG. 15(b), the processor tile 1501 may include a first encapsulated software module to select an adjacent processor tile, e.g., a processor tile 1505 based on a selection criterion. In addition, each intermediate processor tile, e.g., a processor tile 1507, of the signal pathway 1510 may include a cloned copy of the first encapsulated software module from the processor tile 1501 to select an adjacent non-faulty processor tile and a non-faulty interconnect, based on a selection criterion of the signal pathway 1510. The cloning of the first encapsulated software module may be performed through the local bulletin boards, as described for FIG. 4. For example, the processor tile 1507 may select a processor tile 1508 to be a part of the signal pathway 1510.

In embodiments, as shown in FIG. 15(c), the processor tile 1503 may include a second encapsulated software module to traverse the signal pathway 1510 in a reverse order from the processor tile 1503 to the processor tile 1501. The second encapsulated software module originated from the processor tile 1503 may be cloned to the intermediate processor tiles, e.g., the processor tile 1508, the processor tile 1507, and the processor tile 1505, and may be cloned to be a second encapsulated software module of the processor tile 1501, along the signal pathway 1510 following a reversed order from the processor tile 1503 to the processor tile 1501. For example, the processor tile 1501 may receive the cloned copy of the second encapsulated software module from the adjacent processor tile 1505, which may be viewed as a confirmation for the processor tile 1501 that all intermediate processor tiles of the signal pathway 1510 to the processor tile 1503 has been selected.

In embodiments, the processor tile 1501 may further include a third encapsulated software module, which may further configure or cause to be configured, the internal circuitry of the processor tile 1501 and the interconnect with the adjacent processor tile 1505. Similarly, the third encapsulated software module from the processor tile 1501 may be cloned into the adjacent processor tile 1505 to configure the processor tile 1505 and its interconnect. Each intermediate processor tile of the signal pathway 1510 may be configured similarly by a cloned copy of the third encapsulated software module. When the last processor tile 1503 is configured, the signal pathway 1510 may become active.

Figure 16:
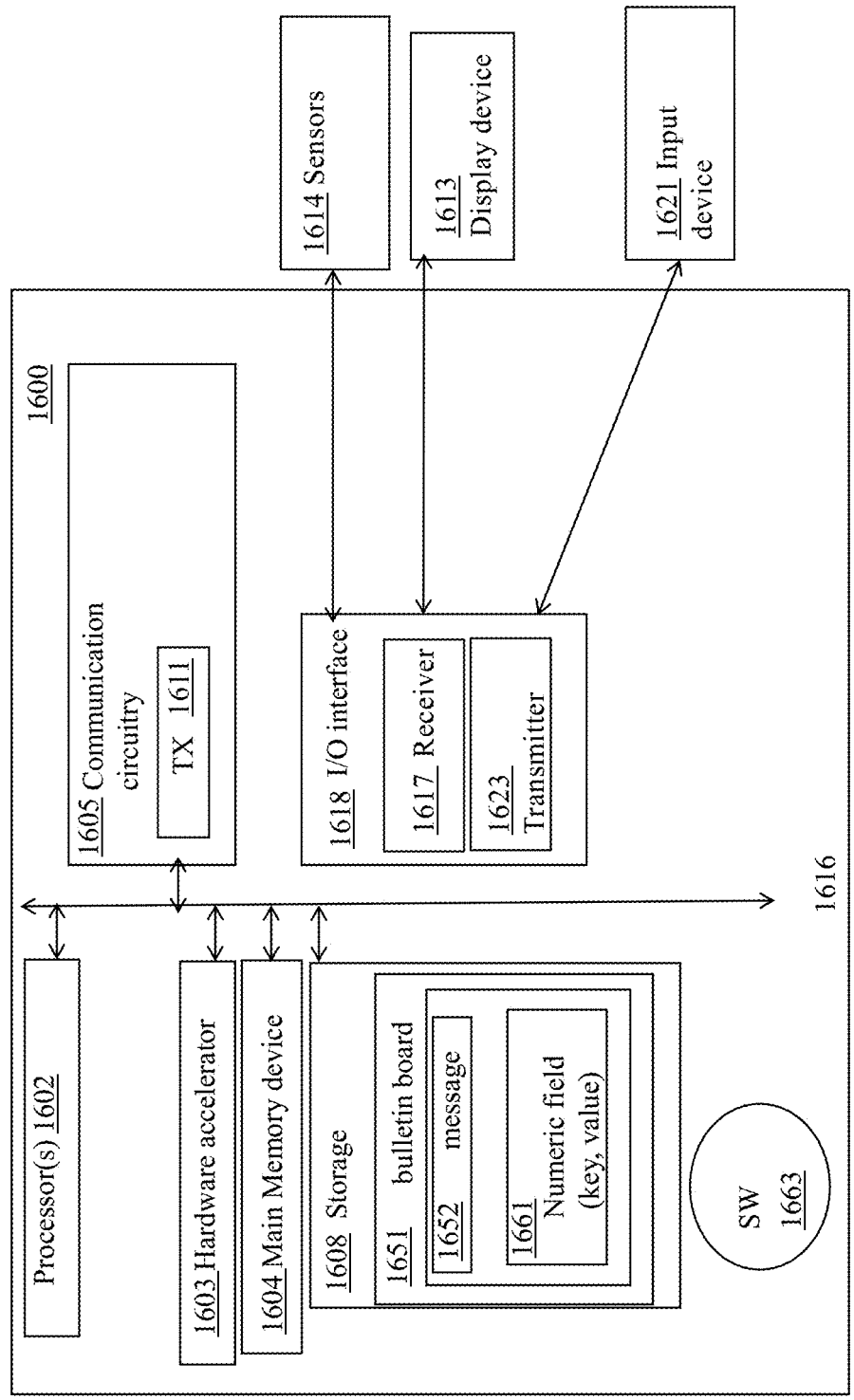
FIG. 16 illustrates an example device suitable for use to practice various aspects of the present disclosure, in accordance with various embodiments.

FIG. 16 illustrates an example device 1600 suitable for use to practice various aspects of the present disclosure, in accordance with various embodiments. The device 1600 may be used to implement functions of the processor tile 101, or any other processor tiles of the computational device 100 shown in FIG. 1, the processor tile 221, or any other processor tiles of the computational device 220 shown in FIG. 2, the processor tile 300 shown in FIG. 3, the processor tile 410 shown in FIG. 4, or functions of any processor tiles shown in FIGS. 1-15.

As shown, the device 1600 may include one or more execution units 1602, and optionally, a hardware accelerator 1603 (which may be an ASIC or a FPGA). In alternate embodiments, the hardware accelerator 1603 may be part of execution unit(s) 1602, or integrated together on a SOC. Additionally, the device 1600 may include a main memory device 1604, which may be any one of a number of known persistent storage medium, and a data storage circuitry 1608. In addition, the 1600 may include an I/O interface circuitry 1618 having a transmitter 1623 and a receiver 1617, coupled to one or more sensors 1614, a display device 1613, and an input device 1621. Furthermore, the device 1600 may include communication circuitry 1605 including e.g., a transceiver (Tx) 1611. The elements may be coupled to each other via bus 1616.

In embodiments, when the device 1600 may implement a processor tile, the storage 1608 may include a bulletin board 1651 to hold a message 1652, and a numeric field 1661. An encapsulated software module 1663 may be executed by the execution unit(s) 1602, which may be equivalent to an execution unit 303 in FIG. 3. The bulletin board 1651, the message 1652, the numeric field 1661, and the encapsulated software module 1663, may be similar to the bulletin board 351, the message 352, the numeric field 361, and the encapsulated software module 301, as shown in FIG. 3, or other corresponding components illustrated or described in FIGS. 1-15.

In embodiments, the execution unit(s) 1602 (also referred to as "execution circuitry 1602") may be one or more processing elements configured to perform basic arithmetical, logical, and input/output operations by carrying out instructions. Execution circuitry 1602 may be implemented as a standalone system/device/package or as part of an existing system/device/package.

In embodiments, the memory 1604 (also referred to as "memory circuitry 1604" or the like) and storage 1608 may be circuitry configured to store data or logic for operating the computer device 1600. The memory circuitry 1604 may include number of memory devices may be used to provide for a given amount of system memory. As examples, the memory circuitry 1604 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, antifuses, etc.) that may be configured in any suitable implementation as are known.

The number, capability and/or capacity of these elements 1602-1661 may vary, depending on the number of other devices the device 1600 is configured to support. Otherwise, the constitutions of elements 1602-1661 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 17:
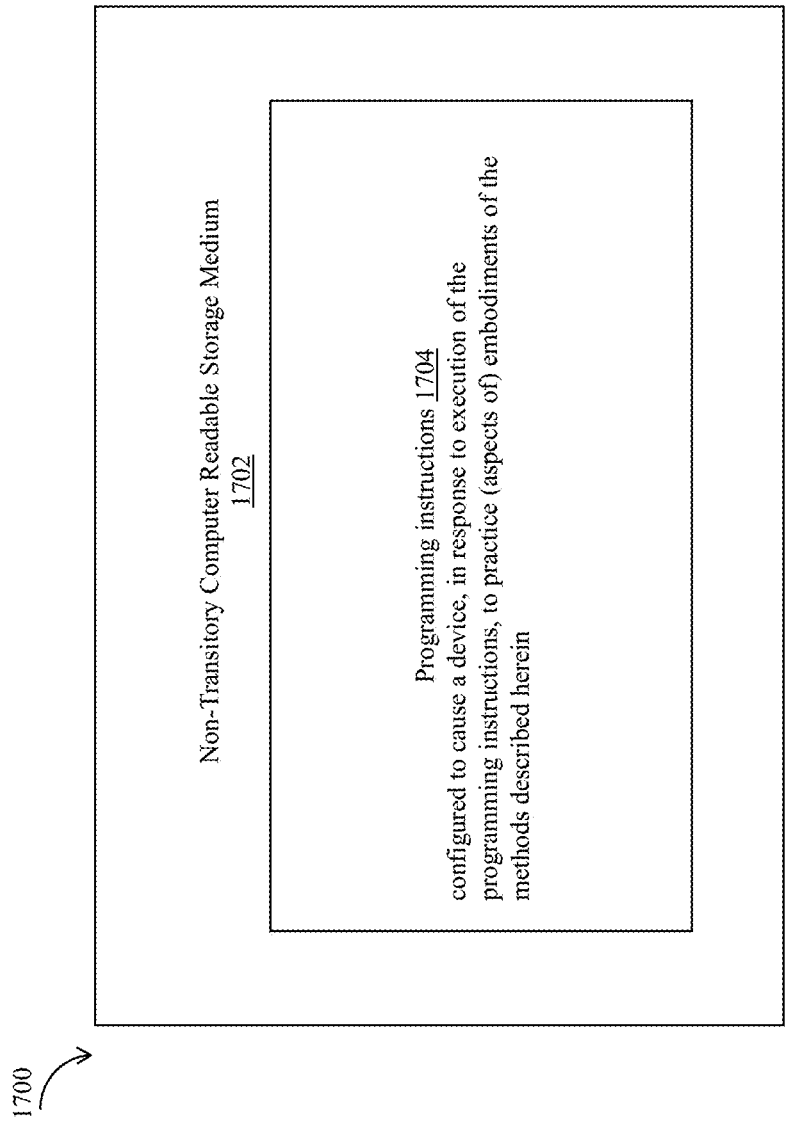
FIG. 17 illustrates a storage medium having instructions for practicing methods described with references to FIGS. 1-16, in accordance with various embodiments.

Furthermore, the present disclosure may take the form of a computer program product embodied in any tangible or non-transitory medium of expression having computer-usable program code embodied in the medium. FIG. 17 illustrates an example computer-readable non-transitory storage medium that may be suitable for use to store instructions that cause an apparatus or a computing device, in response to execution of the instructions by the apparatus or the computing device, to practice selected aspects of the present disclosure. As shown, non-transitory computer-readable storage medium 1702 may include a number of programming instructions 1704. Programming instructions 1704 may be configured to enable a device, e.g., device 1600, in particular, processor(s) 1602, in response to execution of the programming instructions, to perform, e.g., various operations associated with a computational device forming multiple signal pathways according to governing equations for a physical system, as shown in FIGS. 1-16.

In alternate embodiments, programming instructions 1704 may be disposed on multiple computer-readable non-transitory storage media 1702 instead. In alternate embodiments, programming instructions 1704 may be disposed on computer-readable transitory storage media 1702, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include a multi-tile processor, comprising: a plurality of processor tiles; and a plurality of interconnects selectively coupling the plurality of processor tiles to each other; wherein at least a first processor tile of the plurality of processor tiles includes a memory to store a bulletin board to hold a message, an execution unit coupled to the memory, and an encapsulated software module to be executed by the execution unit; wherein the encapsulated software module, in response to execution, selects a second processor tile of the plurality of processor tiles, coupled with the first processor tile by an interconnect, to be a part of a signal pathway, based at least in part on a selection criterion of the signal pathway, and the message held in the bulletin board; and wherein the encapsulated software module is to post and read a message at the bulletin board stored in the memory, or read a message from a bulletin board stored in a memory of the second processor tile.

Example 2 may include the multi-tile processor of example 1 and/or some other examples herein, wherein one or more of the plurality of processor tiles, or one or more of the plurality of interconnects are faulty.

Example 3 may include the multi-tile processor of example 1 and/or some other examples herein, wherein the selection criterion is based on a governing equation for a physical system having multiple elements, and one of the multiple elements of the physical system corresponds to the first processor tile.

Example 4 may include the multi-tile processor of example 1 and/or some other examples herein, wherein the selection criterion comprises a relationship between the first processor tile and remaining ones of the plurality of processor tiles, defined by a congestion, a distance, a load balance, a heat energy, or a boundary limit.

Example 5 may include the multi-tile processor of example 1 and/or some other examples herein, wherein the encapsulated software module includes an application programming interface (API), and wherein the API includes commands to communicate with the execution unit and to communicate with other processor tiles of the plurality of processor tiles.

Example 6 may include the multi-tile processor of example 1 and/or some other examples herein, wherein the encapsulated software module includes a set of rules, wherein a rule specifies a response to one or more messages held in the bulletin board, wherein the response includes information for a replication operation, information for a self-deletion operation, information for an operation to post a local message, information for an idling operation, information for an operation to update a hop count of the signal pathway, information for a propagation operation, information for a numerical calculation, or information for an operation to estimate a distance.

Example 7 may include the multi-tile processor of example 1 and/or some other examples herein, wherein the encapsulated software module is to post the message with a payload having data or code to be delivered to the second processor tile.

Example 8 may include the multi-tile processor of example 7 and/or some other examples herein, wherein the data or the code included in the payload are generated by the encapsulated software module based on an atomic function, and wherein the atomic function includes a parameter, an equation, or a single operation.

Example 9 may include the multi-tile processor of example 1 and/or some other examples herein, wherein the encapsulated software module includes a state vector, the state vector is encoded into a tokenized message to represent the encapsulated software module, the tokenized message is posted in the bulletin board, and the encapsulated software module can be instantiated by processing the tokenized message.

Example 10 may include the multi-tile processor of example 1 and/or some other examples herein, wherein the encapsulated software module is a first encapsulated software module; wherein the first processor tile includes multiple encapsulated software modules, the first encapsulated software module being one of the multiple encapsulated software modules, wherein the first processor tile further includes a virtual encapsulated software module to interleave execution of the multiple encapsulated software modules by time-shared processing on the execution unit.

Example 11 may include the multi-tile processor of example 1 and/or some other examples herein, wherein the first processor tile is further associated with a numeric field equivalent to a value of a continuous function discretely sampled at the first processor tile, the numeric field comprises a set of key-value pair posted in the bulletin board, and generated or managed by the encapsulated software module.

Example 12 may include the multi-tile processor of example 11 and/or some other examples herein, wherein the encapsulated software module is to detect an unoccupied processor tile among the plurality of processor tiles when the unoccupied processor tile does not have a copy of the encapsulated software module, and wherein on detection of the unoccupied processor file, the encapsulated software module clones a copy of itself to be placed into the unoccupied processor tile to make the unoccupied processor tile an occupied processor tile, wherein the cloned copy of the encapsulated software module in the occupied processor tile includes a numeric field associated with the occupied processor tile, and the numeric field of the occupied processor tile is updated from the numeric field of the first processor tile.

Example 13 may include the multi-tile processor of example 11 and/or some other examples herein, wherein the numeric field of the first processor tile is a first numeric field of the first processor tile, and the encapsulated software module is to compute a second numerical field based on numerical fields of the plurality of processor tiles, when the encapsulated software module does not detect an unoccupied processor tile among the plurality of processor tiles.

Example 14 may include the multi-tile processor of example 11 and/or some other examples herein, wherein the first processor tile is further associated with a hierarchical numeric field, the hierarchical numeric field includes a first level numeric field and a second level numeric field, and the second level numeric field is computed by the encapsulated software module based on the first level numeric field.

Example 15 may include a multi-tile processor, comprising: a plurality of processor tiles; a plurality of interconnects selectively coupling the plurality of processor tiles to each other; wherein one or more of the plurality of processor tiles, or one or more of the plurality of interconnects are faulty; and a signal pathway between a first processor tile and a second processor tile of the plurality of processor tiles, wherein the signal pathway includes a set of non-faulty processor tiles and a set of non-faulty interconnects selected from the plurality of processor tiles and the plurality of interconnects, and wherein each intermediate processor tile of the signal pathway, between the first and the second processor file, is to select an adjacent non-faulty processor tile and a non-faulty interconnect coupling the selecting processor tile to the adjacent non-faulty processor tile to constitute the signal pathway.

Example 16 may include the multi-tile processor of example 15 and/or some other examples herein, wherein the first processor tile includes a memory having a first encapsulated software module inserted by an external agency, a numeric field, and a bulletin board, and wherein the numeric field includes an initial hop count when the first encapsulated software module is inserted into the first processor tile, and the first processor tile is to clone a copy of the first encapsulated software module for an adjacent processor tile through the bulletin board.

Example 17 may include the multi-tile processor of example 16 and/or some other examples herein, wherein each intermediate processor tile of the signal pathway includes a cloned copy of the first encapsulated software module to select an adjacent non-faulty processor tile and a non-faulty interconnect, based on a selection criterion of the signal pathway.

Example 18 may include the multi-tile processor of example 17 and/or some other examples herein, wherein the signal pathway between the first processor tile and the second processor tile is a shortest path between the first processor tile and the second processor tile based on the selection criterion applied to the plurality of processor tiles.

Example 19 may include the multi-tile processor of example 15 and/or some other examples herein, wherein the second processor tile includes a memory having a second encapsulated software module to traverse the signal pathway in a reverse order from the second processor tile to the first processor tile, and further configure or cause to be configured, the second processor tile, each intermediate processor tile of the signal pathway, and the first processor tile.

Example 20 may include the multi-tile processor of example 15 and/or some other examples herein, wherein the plurality of processor tiles includes about 500 processor tiles to about 70,000 processor tiles.

Example 21 may include the multi-tile processor of example 15 and/or some other examples herein, wherein the one or more faulty processor tiles or the one or more faulty interconnects amount to about 4%-20% of the plurality of processor tiles or 4%-20% of the plurality of interconnects.

Example 22 may include a method for configuring a signal pathway on an integrated circuit (IC) die, comprising: selecting, by a first processor file, an adjacent processor tile of the first processor tile to be a part of the signal pathway to a second processor tile, the adjacent, first and second processor tiles being members of the IC die; receiving subsequently, from the adjacent processor tile, by the first processor tile, a confirmation that all intermediate processor tiles of the signal pathway to the second processor tile have been selected; and configuring, by the first processor tile, in response to the receipt of the confirmation, internal circuitry of the first processor tile, to enable the first processor tile to participate in signal routing on the signal pathway.

Example 23 may include the method of example 22 and/or some other examples herein, wherein the first processor tile includes a first encapsulated software module, wherein selecting the adjacent processor tile by the first processor tile comprises selecting the adjacent processor tile by the first encapsulated software module, based on a selection criterion, and a second encapsulated software module for configuring the internal circuitry of the first processor tile.

Example 24 may include the method of example 23 and/or some other examples herein, wherein the first processor tile further includes a third encapsulated software module, wherein the receiving from the adjacent processor tile, by the first processor tile, the confirmation that all intermediate processor tiles of the signal pathway to the second processor tile has been selected comprises receiving the third encapsulated software module from the adjacent processor tile that is a cloned copy of an encapsulated software module originated from the second processor tile.

Example 25 may include the method of example 24 and/or some other examples herein, wherein the encapsulated software module originated from the second processor tile is cloned to the intermediate processor tiles, and is cloned to be the third encapsulated software module of the first processor tile, along the signal pathway following a reversed order from the second processor tile to the first processor tile.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. A multi-tile processor, comprising:
a plurality of processor tiles disposed on a die; and
a plurality of interconnects disposed on the die to couple adjacent ones of the plurality of processor tiles to each other;
wherein at least a first processor tile of the plurality of processor tiles includes a memory to store a first software module, and an execution unit coupled to the memory to execute the first software module to contribute to establishment of a signal pathway from the first processor to a second processor tile of the plurality of processor tiles;
wherein the first software module, in response to execution, causes the first processor tile to select a third processor tile of the plurality of processor tiles, adjacent to and coupled with the first processor tile by an interconnect, to be a next segment of the signal pathway, based at least in part on a signal pathway selection criterion, and provide a message to the third processor tile to continue building the signal pathway to the second processor tile and select another next segment of the signal pathway,
wherein the first software module is further to, in response to execution:
determine that the third processor tile does not include a copy of the software module; and
clone a copy of itself to be placed into the third processor tile, wherein to clone includes to generate a tokenized message that represents the first software module, and pass the tokenized message to the third processor tile, to cause the third processor tile to read and process the tokenized message, to instantiate the first software module,
wherein the second processor tile includes a second software module, to traverse the signal pathway in a reverse order from the second processor tile to the first processor tile, wherein the second software module is to be cloned to the third processor tile along the signal pathway following the reversed order from the second processor tile to the first processor tile.

2. The multi-tile processor of claim 1, wherein one or more of the plurality of processor tiles, or one or more of the plurality of interconnects are faulty.

3. The multi-tile processor of claim 1, wherein the signal pathway selection criterion is based on a governing equation for a physical system model having multiple mass elements, and one of the multiple mass elements of the physical system model corresponds to the first processor tile.

4. The multi-tile processor of claim 1, wherein the signal pathway selection criterion comprises a relationship between the first processor tile and remaining ones of the plurality of processor tiles, defined by a congestion, a distance, a load balance, a heat energy, or a boundary limit.

5. The multi-tile processor of claim 1, wherein the first software module is encapsulated and includes an application programming interface (API), and wherein the API includes commands to communicate with the software module.

6. The multi-tile processor of claim 1, wherein the first software module includes a set of rules, wherein a rule includes information for a self-deletion operation, or information for an idling operation.

7. The multi-tile processor of claim 1, wherein the first software module is to post to the third processor tile the message associated with the continue building of the signal pathway to the second processor tile and selection of the next segment of the signal pathway.

8. The multi-tile processor of claim 7, wherein the message includes a payload having data or code generated by the software module based on an atomic function, and wherein the atomic function includes a parameter, an equation, or a single operation.

9. The multi-tile processor of claim 1, wherein the first processor tile further includes a virtual software module to interleave execution of the multiple software modules by time-shared processing on the execution unit.

10. The multi-tile processor of claim 1, wherein the first processor tile is further associated with a numeric field equivalent to a value of a continuous function discretely sampled at the first processor tile, the numeric field comprises a set of key-value pair, and generated or managed by the first software module.

11. A method for configuring a signal pathway on an integrated circuit (IC) die, comprising:
   selecting, by a first processor tile, a processor tile adjacent to the first processor tile to be a next segment of the signal pathway to a second processor tile, the selected processor tile being the third processor tile, the adjacent first and third processor tiles being members of the IC die, wherein the first processor tile includes a first software module stored in the first processor tile, and an execution unit to execute the first software module, wherein selecting includes: determining that the third processor tile does not include a copy of the software module; and cloning a copy of itself to be placed into the third processor tile, wherein the cloning includes generating a tokenized message that represents the first software module, and passing the tokenized message to the third processor tile, to cause the third processor tile to read and process the tokenized message, to instantiate the first software module;
   receiving, by the first processor tile, a clone of a second software module included in the second processor tile, wherein the second software module originated from the second processor tile is successively cloned and provided to the intermediate processor tiles, and is further cloned to be the third software module of the first processor tile, via successive cloning along the signal pathway following a reversed order from the second processor tile to the first processor tile;
   receiving subsequently, from the third processor tile, by the first processor tile, a confirmation that all intermediate processor tiles of all subsequent segments of the signal pathway to the second processor tile have been respectively and successively selected by the subsequent intermediate processor tiles, the subsequent intermediate processor tiles being members of the IC die; and
   configuring, by the first processor tile, in response to the receipt of the confirmation, internal circuitry of the first processor tile, to enable the first processor tile to participate in routing signal from the first processor tile to the second processor tile using the signal pathway.

12. The method of claim 11, wherein the first software module is to select the adjacent processor tile of the first processor tile, based on a signal pathway selection criterion.

13. The multi-tile processor of claim 1, wherein the first software module is to post the message in a bulletin board in the third processor tile, or store the message in a bulletin board in the first processor tile for the third processor tile to read.

14. The multi-tile processor of claim 1, wherein the third processor tile selects a fourth processor tile of the plurality of processor tiles, adjacent to and coupled with the third processor tile by another interconnect, to be the other next segment of the signal pathway to continue to build the signal pathway to the second processor tile.

* * * * *